United States Patent
Sanagi et al.

(10) Patent No.: US 8,007,240 B2
(45) Date of Patent: Aug. 30, 2011

(54) IMPELLER OF CENTRIFUGAL FAN AND CENTRIFUGAL FAN DISPOSED WITH THE IMPELLER

(75) Inventors: Tsunehisa Sanagi, Sakai (JP); Hisanori Nishino, Sakai (JP); Azumi Terakawa, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 691 days.

(21) Appl. No.: 10/561,389

(22) PCT Filed: Nov. 18, 2004

(86) PCT No.: PCT/JP2004/017166
§ 371 (c)(1),
(2), (4) Date: Dec. 19, 2005

(87) PCT Pub. No.: WO2005/052377
PCT Pub. Date: Jun. 9, 2005

(65) Prior Publication Data
US 2007/0098556 A1    May 3, 2007

(30) Foreign Application Priority Data
Nov. 27, 2003  (JP) .................................. 2003-396522

(51) Int. Cl.
F04D 29/30  (2006.01)
(52) U.S. Cl. ................. 416/186 R; 416/188; 416/213 A; 416/233; 29/889.72; 29/889.4
(58) Field of Classification Search ............... 29/889.72, 29/889.4; 416/185, 186 R, 182, 188, 213 A, 416/232, 233, 241 A
See application file for complete search history.

(56) References Cited

U.S. PATENT DOCUMENTS

| | | | |
|---|---|---|---|
| 1,600,690 A | | 9/1926 | Meyer |
| 1,983,201 A | * | 12/1934 | Rijswijk ................... 416/186 R |
| 2,231,888 A | * | 2/1941 | Couch .......................... 416/233 |
| 3,144,204 A | | 8/1964 | Bohanon et al. |
| 3,398,883 A | | 8/1968 | Ariewitz |
| 3,426,965 A | | 2/1969 | Kulling |
| 3,536,416 A | * | 10/1970 | Glucksman ............... 416/241 A |
| 4,874,293 A | | 10/1989 | Gutzwiller |
| 4,971,521 A | * | 11/1990 | Atarashi et al. ............... 416/233 |
| 5,209,644 A | * | 5/1993 | Dorman ........................ 416/235 |
| 5,693,992 A | * | 12/1997 | Kurusu et al. .................. 310/63 |
| 6,113,353 A | * | 9/2000 | Sato et al. ..................... 416/232 |
| 6,132,826 A | * | 10/2000 | Kawasaki et al. ............. 416/232 |
| 6,368,062 B1 | | 4/2002 | Yaagami et al. |
| 6,508,627 B2 | * | 1/2003 | Gerken et al. ............ 416/186 R |
| 6,848,887 B2 | * | 2/2005 | Kim ........................ 416/186 R |

FOREIGN PATENT DOCUMENTS

| | | |
|---|---|---|
| DE | 44 46 110 A1 | 6/1995 |
| JP | 52-47567 | 12/1977 |
| JP | 60-18243 A | 1/1985 |

(Continued)

*Primary Examiner* — Christopher Verdier
(74) *Attorney, Agent, or Firm* — Global IP Counselors

(57) ABSTRACT

An impeller of a centrifugal fan includes an end plate, a plurality of blades and an end ring. The blades include blade bodies that are annularly disposed around a shaft and fixed to the end plate. The blades further include blade covers that are attached to the blade bodies. The blade covers and the blade bodies form a hollow space. The end ring is disposed such that it sandwiches the plural blades between itself and the end plate in a shaft direction. The blade covers form at least part of negative-pressure surfaces.

21 Claims, 14 Drawing Sheets

FOREIGN PATENT DOCUMENTS

| | | |
|---|---|---|
| JP | 64-41696 U | 3/1989 |
| JP | 64-41697 U | 3/1989 |
| JP | 4-116699 U | 10/1992 |
| JP | 06-264898 A | 9/1994 |
| JP | 07-10080 Y2 | 3/1995 |
| JP | 8-159091 A | 6/1996 |
| JP | 08-247093 A | 9/1996 |
| JP | 10-196590 A | 7/1998 |
| JP | 2000-170691 A | 6/2000 |
| JP | 2000-230499 A | 8/2000 |
| JP | 2000-233241 A | 8/2000 |
| JP | 2001-032794 | 2/2001 |
| JP | 2001-90692 A | 4/2001 |
| JP | 2002-086567 A | 3/2002 |
| JP | 2002-195096 A | 7/2002 |
| JP | 2003-123511 A | 4/2003 |
| JP | 2003-320585 A | 11/2003 |

* cited by examiner

IMPELLER OF CENTRIFUGAL FAN AND CENTRIFUGAL FAN DISPOSED WITH THE IMPELLER

CROSS-REFERENCE TO RELATED APPLICATIONS

This U.S. National stage application claims priority under 35 U.S.C. §119(a) to Japanese Patent Application No. 2003-396522, filed in Japan on Nov. 27, 2003 the entire contents of which are hereby incorporated by reference.

TECHNICAL FIELD

The present invention relates to an impeller of a centrifugal fan and to a centrifugal fan disposed with the impeller, and more particularly relates to an impeller of a centrifugal fan and to a centrifugal fan disposed with the impeller which sucks in gas from a rotating shaft direction and blows out the gas in a direction intersecting the rotating shaft.

BACKGROUND ART

Among ventilation systems, air conditioners and air cleaners, sometimes a centrifugal fan such as a turbofan or a diagonal-flow fan of the type that sucks in gas from a rotating shaft direction and blows out the gas in a direction intersecting the rotating shaft is used. The impeller configuring the centrifugal fan is mainly configured by a resin-made end plate (main plate) that is rotated around the rotating shaft by a drive mechanism such as a motor, plural resin-made blades that are annularly disposed around the rotating shaft and integrally molded with the end plate, and a resin-made end ring (side plate) that is disposed such that it sandwiches the plural blades between itself and the end plate in the shaft direction and is fixed to the plural blades. In order to reduce the weight of the impeller, sometimes the blades are made hollow by disposing a space inside the blades when the plural blades are integrally molded with the end ring (e.g., see Japanese Patent Publication No. 8-159091 and Japanese Utility Model Application Publication No. 4-116699).

On the other hand, in order to improve the blowing performance and noise performance, sometimes the blades are given shapes that extend in the shaft direction while twisting between the end plate and the end ring (called "three-dimensional blades" below). However, when blades comprising three-dimensional blades are integrally molded with the end plate as hollowed blades (called "hollow blades" below), only a small space can be formed inside the blades due to restrictions on the direction in which they are removed from the mold, and the weight of the impeller cannot be sufficiently reduced.

Also, the plural blades are welded to the end ring by ultrasonic welding, and when the blades are made into hollow blades as described above, sometimes it becomes difficult to weld the blades to the end ring by ultrasonic welding because the blades become thin and their strength is reduced.

DISCLOSURE OF THE INVENTION

It is an object of the present invention to enable, in a centrifugal fan disposed with a resin-made impeller of the type that sucks in gas from a rotating shaft direction and blows out the gas in a direction intersecting the rotating shaft, a reduction in the weight of the impeller even when utilizing blades that extend while twisting in the shaft direction.

An impeller of a centrifugal fan according to a first aspect of the present invention is an impeller of a centrifugal fan that sucks in gas from a rotating shaft direction and blows out the gas in a direction intersecting the rotating shaft. The impeller includes a main plate, plural hollow blades and a side plate. The main plate rotates around the rotating shaft. The hollow blades comprise first surface portions that are annularly disposed around the rotating shaft and integrally molded with or fixed to the main plate and second surface portions that are attached to the first surface portions and configure a hollow space between themselves and the first surface portions. The side plate is disposed such that it sandwiches the plural hollow blades between itself and the main plate in the rotating shaft direction, and is integrally molded with or fixed to the plural first surface portions. The second surface portions are disposed such that they configure at least part of negative-pressure surfaces of the hollow blades.

In this impeller of a centrifugal fan, the plural hollow blades are configured by the first surface portions and the second portions attached to the first surface portions. Thus, the hollowing of the blades can be promoted and the weight of the impeller can be reduced even when the hollow blades have shapes (i.e., three-dimensional blades) that extend in the shaft direction while twisting between the main plate and the side plate.

Moreover, the first surface portions are integrally molded with or fixed to the main plate, and the second surface portions are disposed such that they configure at least part of the negative-pressure surfaces of the hollow blades. Thus, it becomes difficult for drawbacks such as squeaking and wind roar to occur because the second surface portions attached to the first surface portions are prevented from rising due to centrifugal force and the hollow blades are prevented from being deformed.

An impeller of a centrifugal fan according to a second aspect of the present invention is an impeller of a centrifugal fan that sucks in gas from a rotating shaft direction and blows out the gas in a direction intersecting the rotating shaft. The impeller includes a main plate, plural hollow blades and a side plate. The main plate rotates around the rotating shaft. The hollow blades comprise first surface portions that are annularly disposed around the rotating shaft and integrally molded with or fixed to the main plate and second surface portions that are attached to the first surface portions and configure a hollow space between themselves and the first surface portions. The side plate is disposed so as to sandwich the plural hollow blades between itself and the main plate in the rotating shaft direction and integrally molded with or fixed to the plural first surface portions. The second surface portions are disposed such that even if centrifugal force resulting from the rotation of the main plate acts thereon, the state where they are attached to the first surface portions is maintained.

In this impeller of a centrifugal fan, the plural hollow blades are configured by the first surface portions and the second surface portions attached to the first surface portions. Thus, the hollowing of the blades can be promoted and the weight of the impeller can be reduced even when the hollow blades have shapes (i.e., three-dimensional blades) that extend in the shaft direction while twisting between the main plate and the side plate.

Moreover, the first surface portions are integrally molded with or fixed to the main plate, and the second surface portions are disposed such that even if centrifugal force resulting from the rotation of the main plate acts thereon, the state where they are attached to the first surface portions is maintained. Thus, it becomes difficult for drawbacks such as squeaking and wind roar to occur because the second surface portions attached to the first surface portions are prevented from rising due to centrifugal force and the hollow blades are prevented from being deformed.

An impeller of a centrifugal fan according to a third aspect of the present invention is the impeller of the centrifugal fan according to the first or second aspect of the present invention, wherein the second surface portions are attached to the first surface portions by being fitted into the first surface portions.

In this impeller of a centrifugal fan, the assembly of the hollow blades is easy because the second surface portions are attached to the first surface portions by being fitted into the first surface portions.

An impeller of a centrifugal fan according to a fourth aspect of the present invention is the impeller of the centrifugal fan according to any of the first to third aspects of the present invention, wherein the plural first surface portions and the side plate are separately molded.

In this impeller of a centrifugal fan, the molding of the first surface portions configuring the hollow blades and the molding of the side plate become easy because the plural first surface portions and the side plate are separate members.

An impeller of a centrifugal fan according to a fifth aspect of the present invention is the impeller of the centrifugal fan according to the fourth aspect of the present invention, wherein the plural first surface portions are fixed to the side plate by laser welding.

In this impeller of a centrifugal fan, laser welding is utilized as the method of fixing the first surface portions to the side plate. Thus, it becomes possible to weld, to the side plate, hollow blades that have been hollowed, become thin, and whose strength has been lowered.

An impeller of a centrifugal fan according to a sixth aspect of the present invention is the impeller of the centrifugal fan according to the fifth aspect of the present invention, wherein the material configuring the side plate has a higher light transmittance than that of the material configuring the first surface portions.

In this impeller of a centrifugal fan, the work of laser welding the side plate and the first surface portions together can be easily conducted from the side plate side because the material configuring the side plate has a higher light transmittance than that of the material configuring the first surface portions.

An impeller of a centrifugal fan according to a seventh aspect of the present invention is the impeller of the centrifugal fan according to any of the fourth to sixth aspects of the present invention, further comprising a side plate-side guide mechanism for positioning the hollow blades in the side plate.

In this impeller of a centrifugal fan, workability when fixing the hollow blades to the side plate is improved because the hollow blades can be positioned when they are fixed to the side plate.

An impeller of a centrifugal fan according to an eighth aspect of the present invention is the impeller of the centrifugal fan according to any of the first to seventh aspects of the present invention, wherein the plural first surface portions and the main plate are separately molded.

In this impeller of a centrifugal fan, the molding of the first surface portions configuring the hollow blades and the molding of the main plate become easy because the plural hollow blades and the main plate are separate members.

An impeller of a centrifugal fan according to a ninth aspect of the present invention is the impeller of the centrifugal fan according to the eighth aspect of the present invention, wherein the plural first surface portions are fixed to the main plate by laser welding.

In this impeller of a centrifugal fan, laser welding is utilized as the method of fixing the first surface portions to the main plate. Thus, it becomes possible to weld, to the main plate, hollow blades that have been hollowed, become thin, and whose strength has been lowered.

An impeller of a centrifugal fan according to a tenth aspect of the present invention is the impeller of the centrifugal fan according to the ninth aspect of the present invention, wherein the material configuring the main plate has a higher light transmittance than that of the material configuring the first surface portions.

In this impeller of a centrifugal fan, the work of laser welding the main plate and the first surface portions together can be easily conducted from the main plate side because the material configuring the main plate has a higher light transmittance than that of the material configuring the first surface portions.

An impeller of a centrifugal fan according to an eleventh aspect of the present invention is the impeller of the centrifugal fan according to any of the eighth to tenth aspects of the present invention, further comprising a main plate-side guide mechanism for positioning the hollow blades in the main plate.

In this impeller of a centrifugal fan, workability when fixing the hollow blades to the main plate is improved because the hollow blades can be positioned when they are fixed to the main plate.

An impeller of a centrifugal fan according to a twelfth aspect of the present invention is the impeller of the centrifugal fan according to any of the first to eleventh aspects of the present invention, wherein the hollow blades include a blade shape retaining mechanism for preventing the second surface portions from being deformed toward their outer peripheral side by centrifugal force.

In this impeller of a centrifugal fan, the second surface portions are prevented from rising due to centrifugal force. As a result, a load in the direction of the first surface portions acts on the second surface portions, but the second surface portions are prevented from being deformed toward the first surface portions and the shapes of the hollow blades are maintained because the blade shape retaining mechanism is disposed in the hollow blades. Thus, it becomes even more difficult for drawbacks such as squeaking and wind roar to occur.

An impeller of a centrifugal fan according to a thirteenth aspect of the present invention is the impeller of the centrifugal fan according to any of the first to twelfth aspects of the present invention, wherein the second surface portions include plural concavo-convexities formed in their surfaces.

When hollow blades are integrally molded with the main plate, it has been difficult to mold concavo-convexities in the surfaces of the blades. However, in this impeller of a centrifugal fan, concavo-convexities can be easily molded in the surfaces of the second surface portions and blowing performance and noise performance can be improved because the second surface portions are separate members from the first surface portions, the main plate and the side plate.

A centrifugal fan according to a fourteenth aspect of the present invention comprises the impeller according to any of the first to thirteenth aspect of the present invention and a drive mechanism that causes the main plate to rotate.

In this centrifugal fan, the blowing performance and the noise performance can be improved because the centrifugal fan is disposed with the impeller where the hollowing of the hollow blades is promoted, the weight of the impeller is reduced, deformation of the hollow blades is prevented, and drawbacks such as squeaking and wind roar are difficult to occur.

BRIEF DESCRIPTION OF THE DRAWINGS

Figure 1:
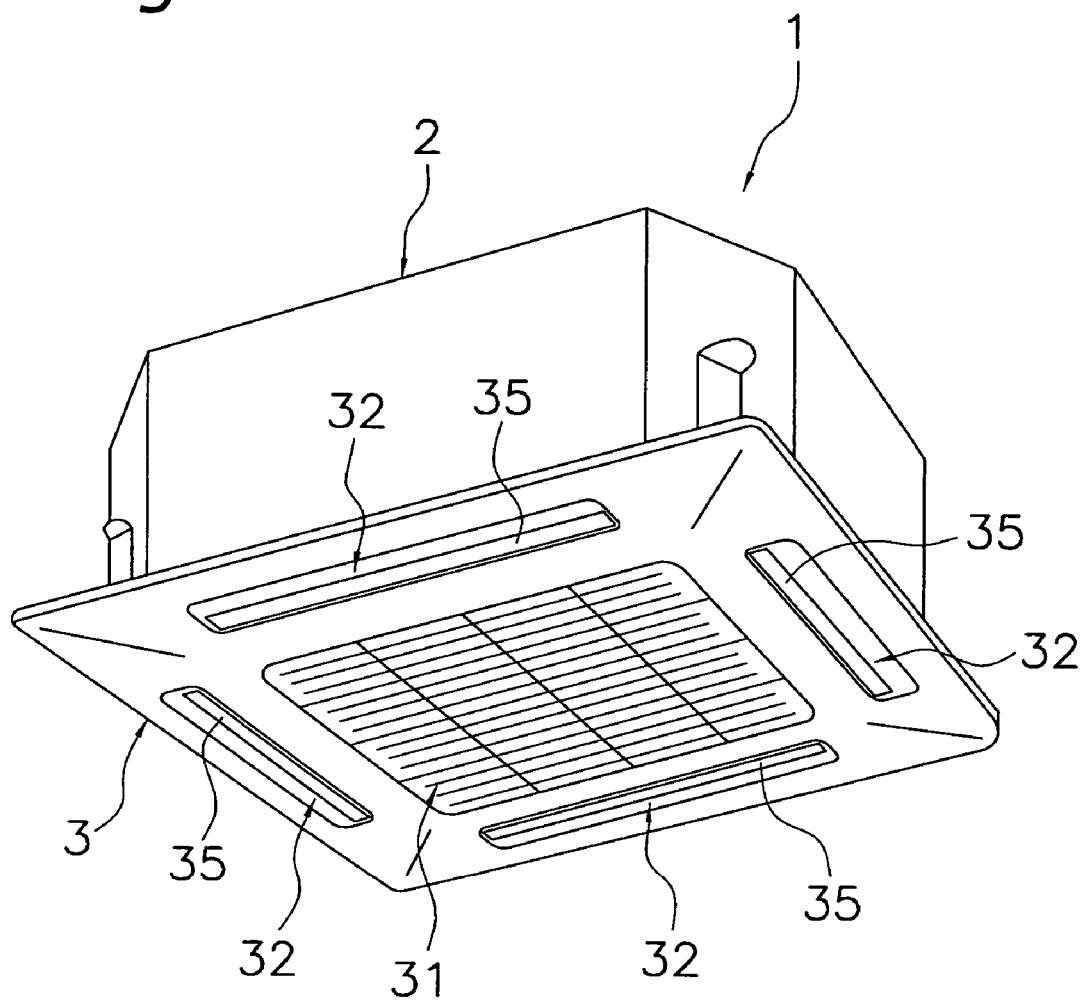
Figure 2:
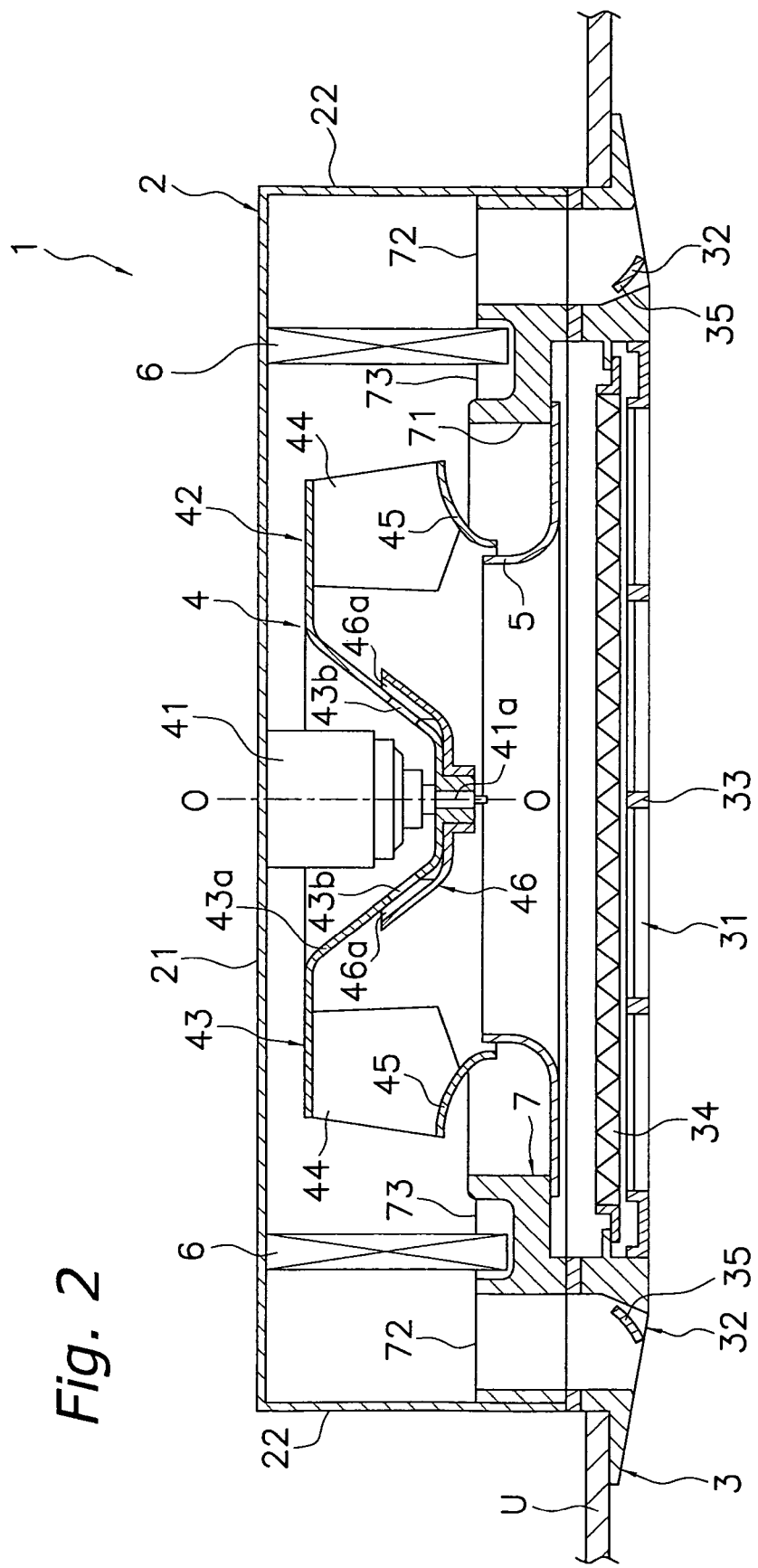
Figure 3:
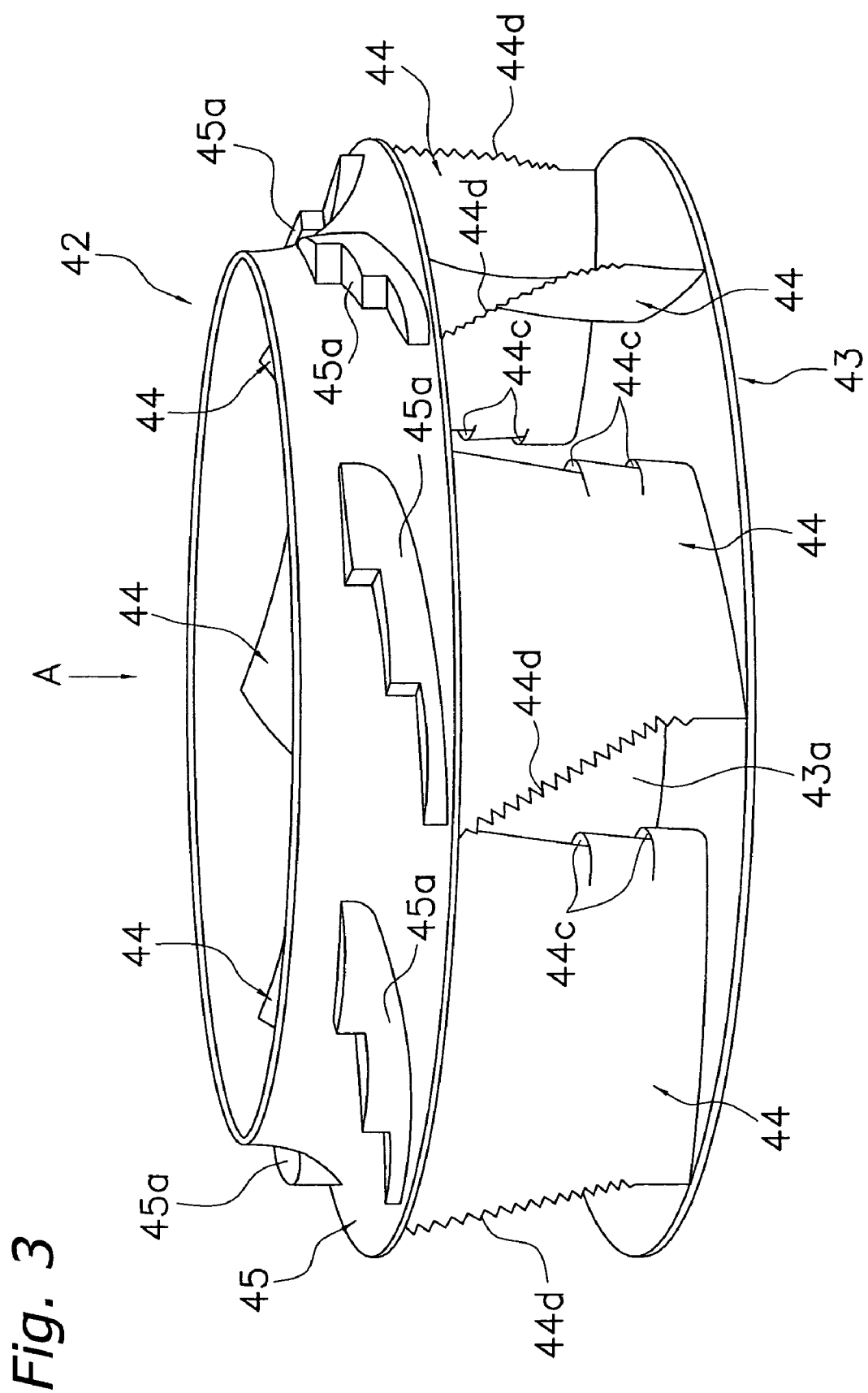
Figure 4:
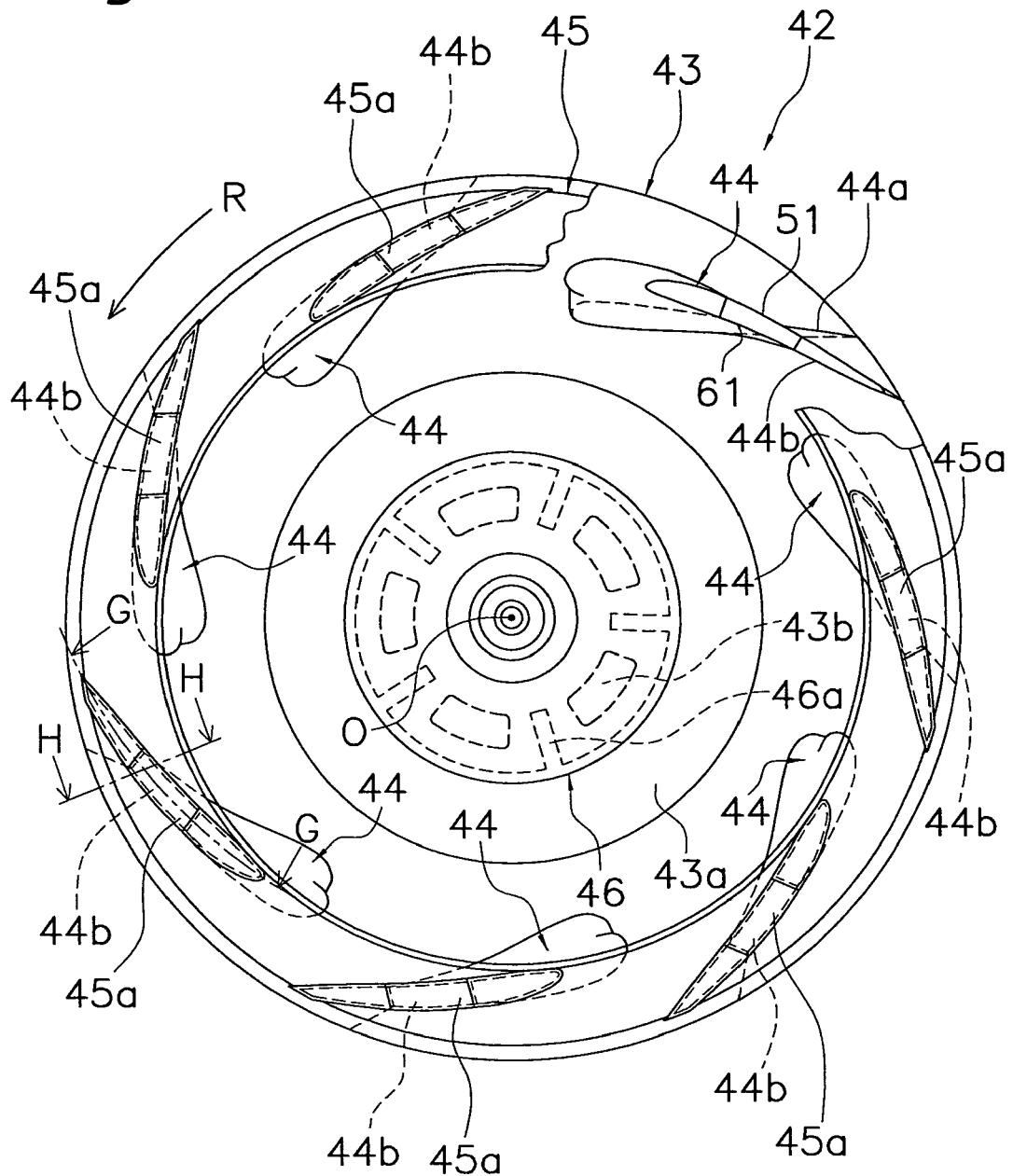
Figure 5:
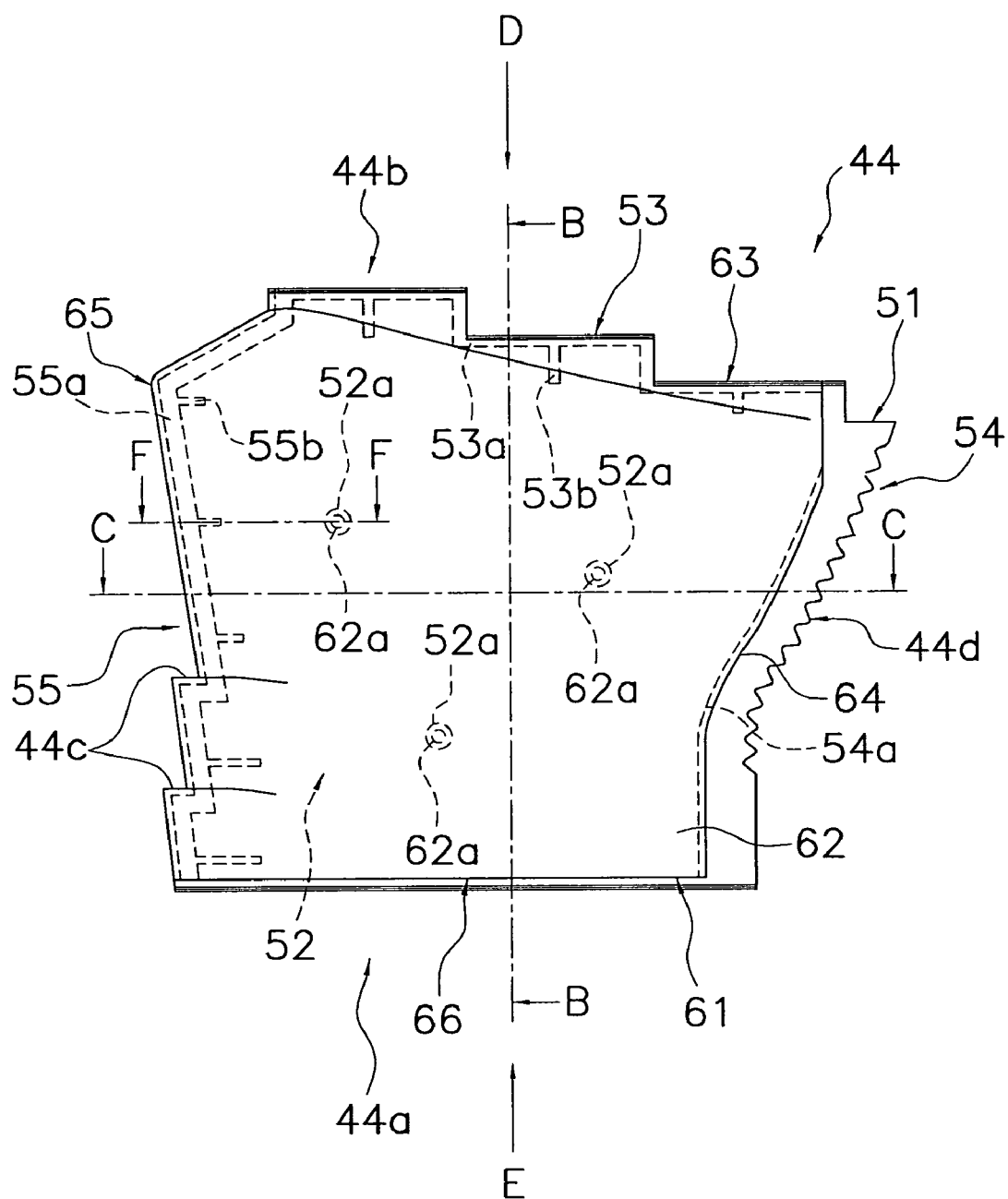
Figure 6:
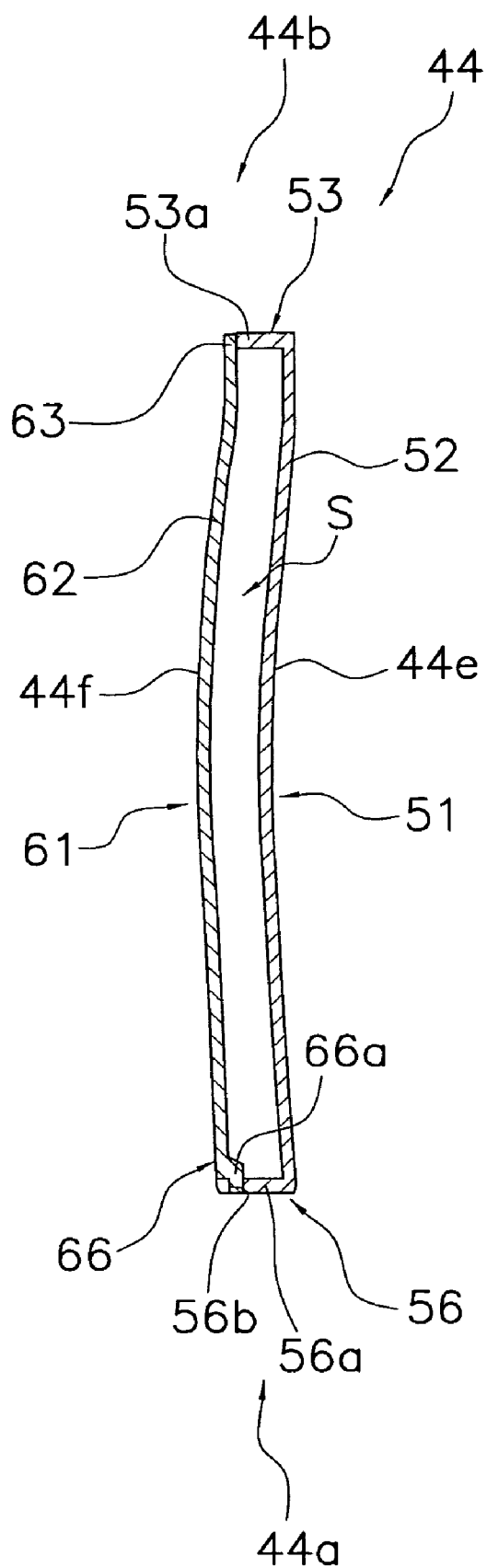
Figure 7:
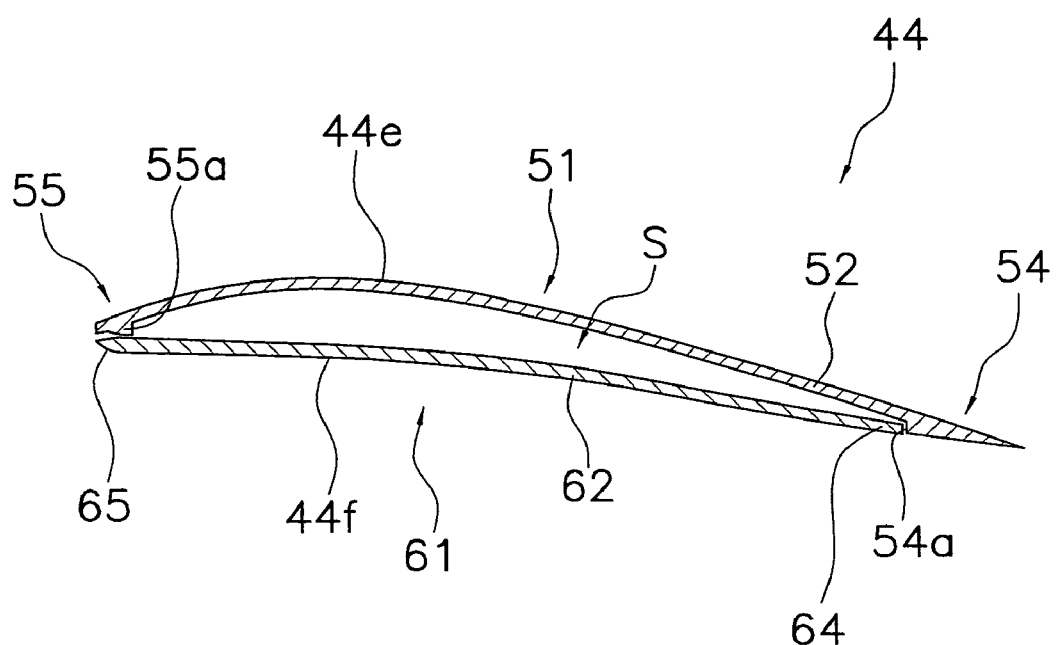
Figure 8:
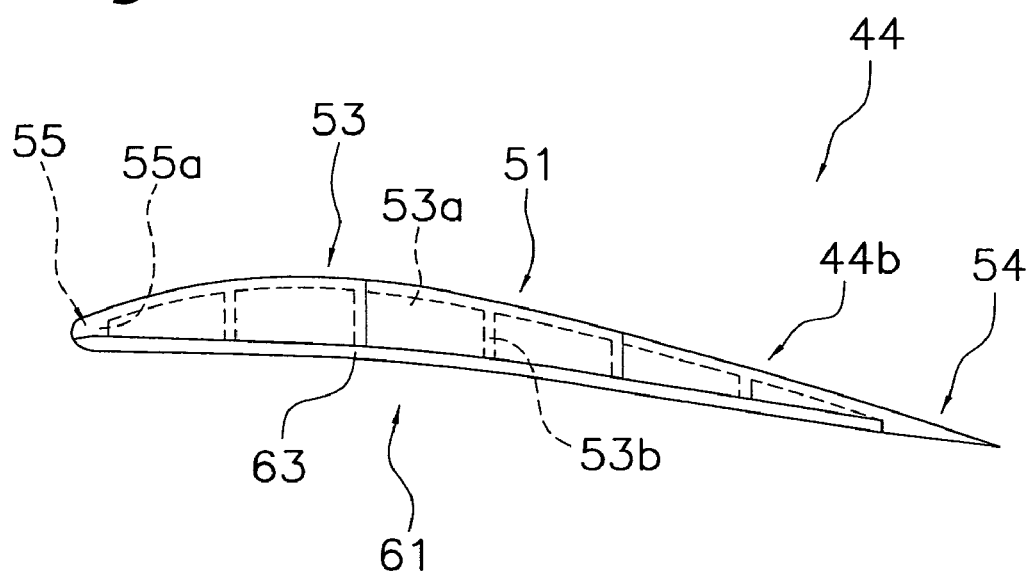
Figure 9:
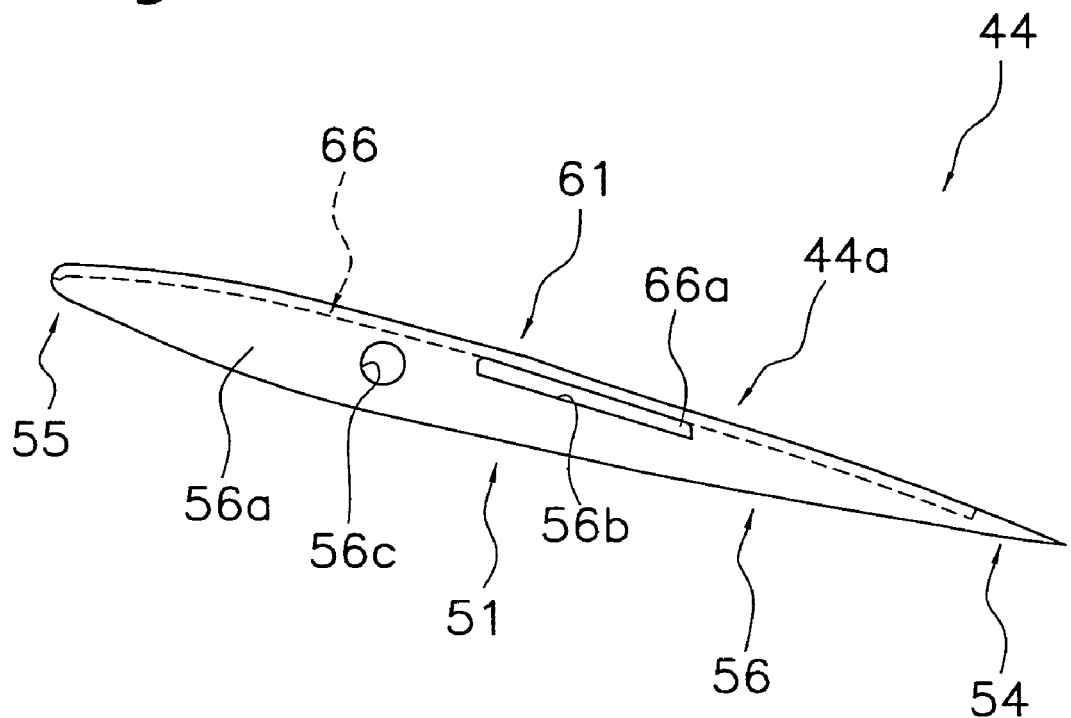
Figure 10:
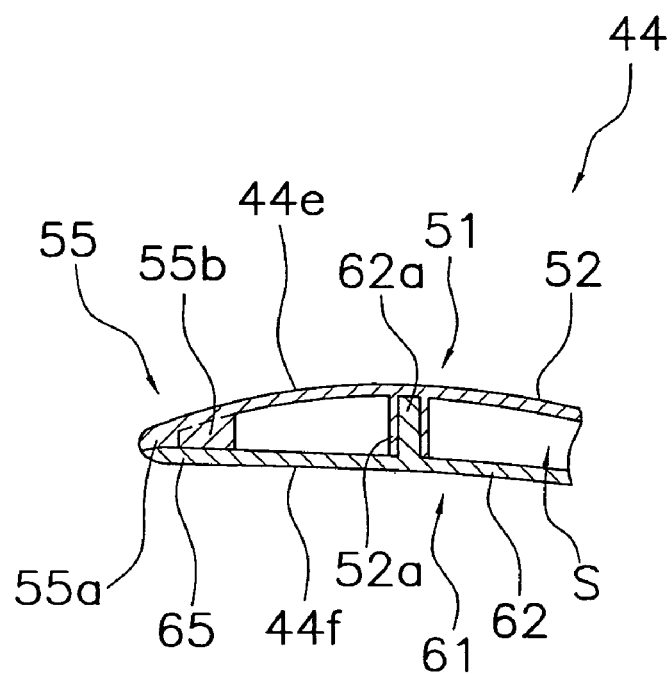
Figure 11:
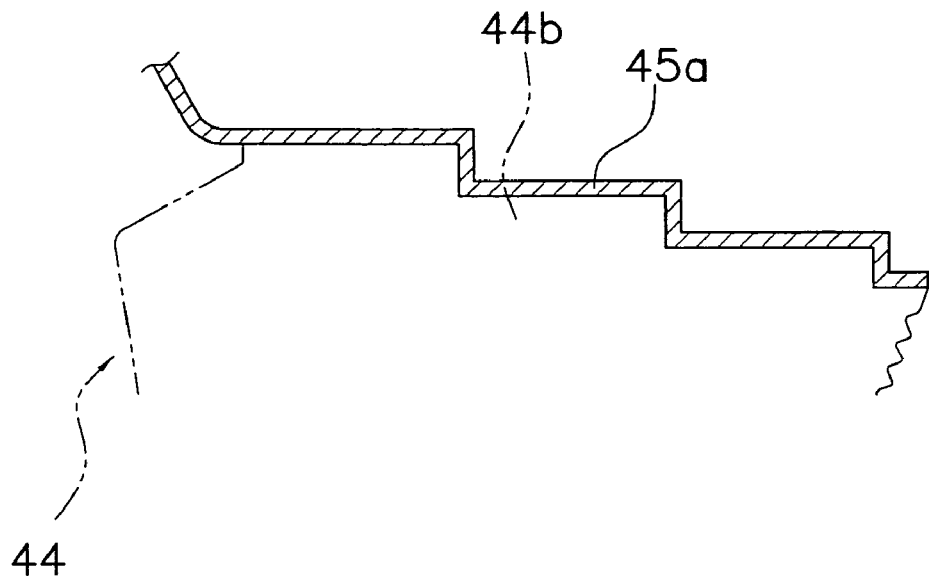
Figure 12:
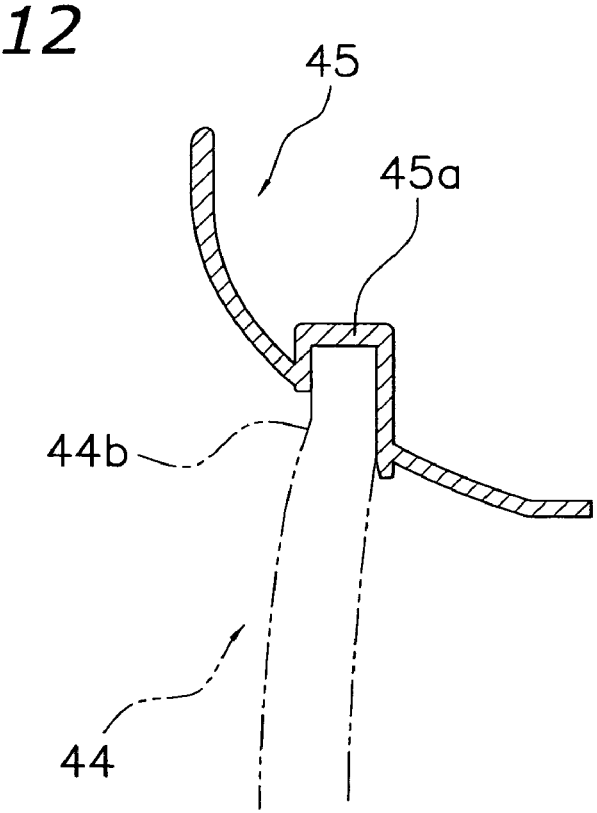
Figure 13:
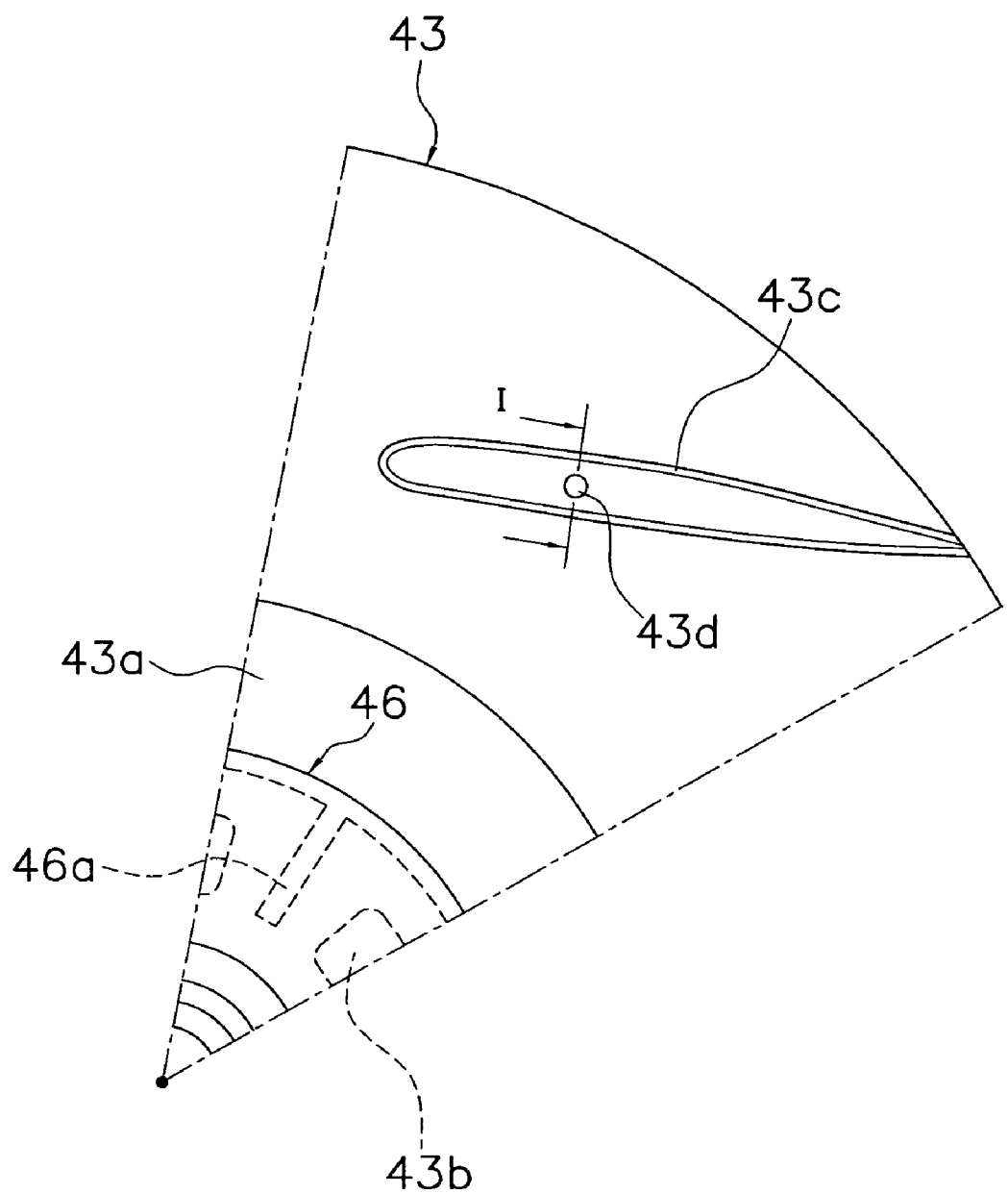
Figure 14:
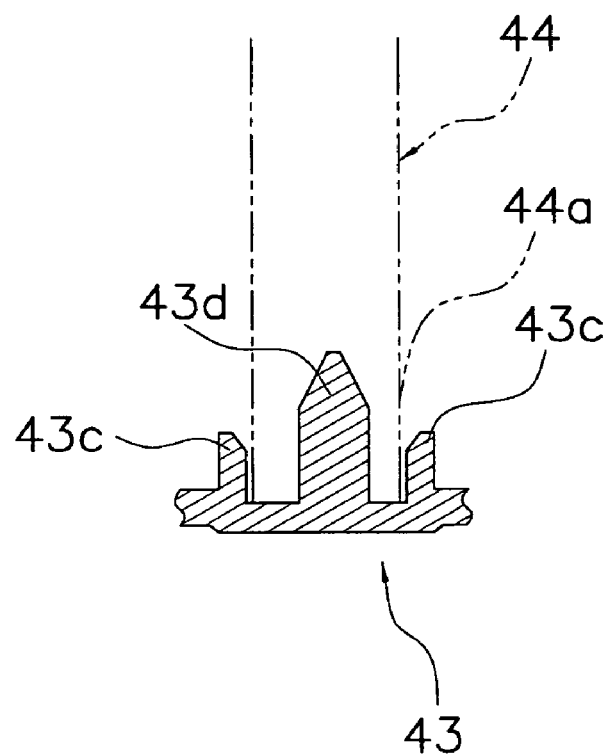
Figure 15:
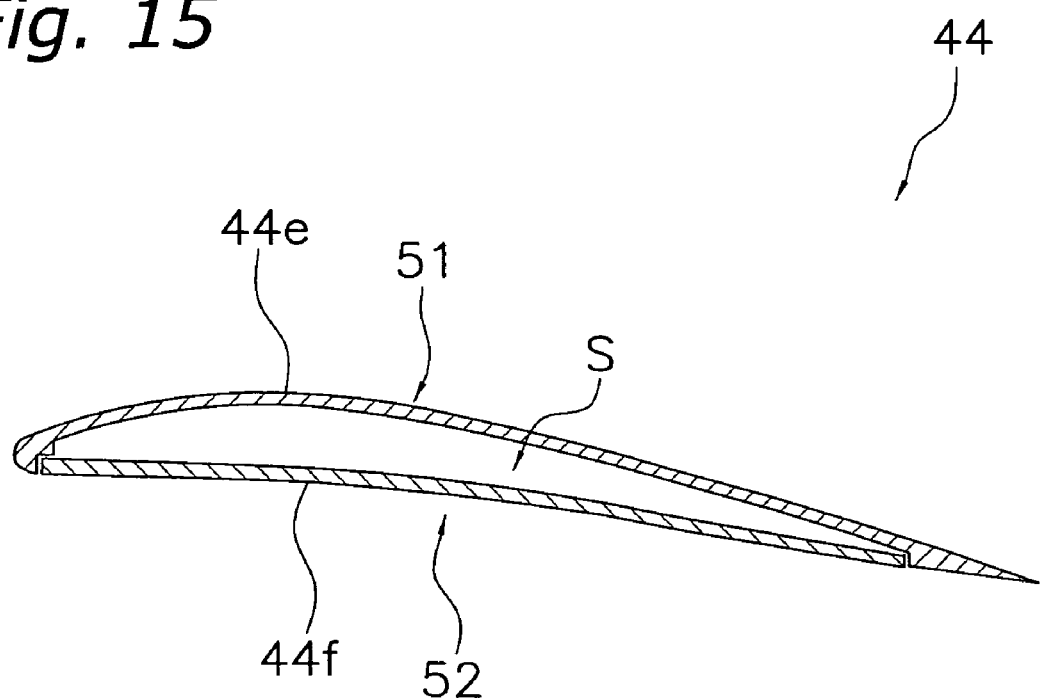
Figure 16:
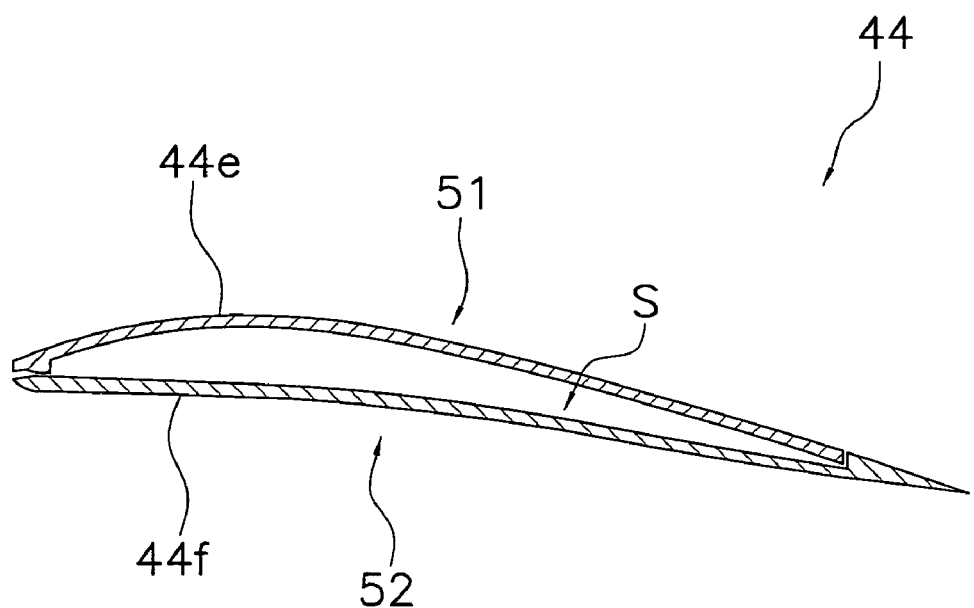
Figure 17:
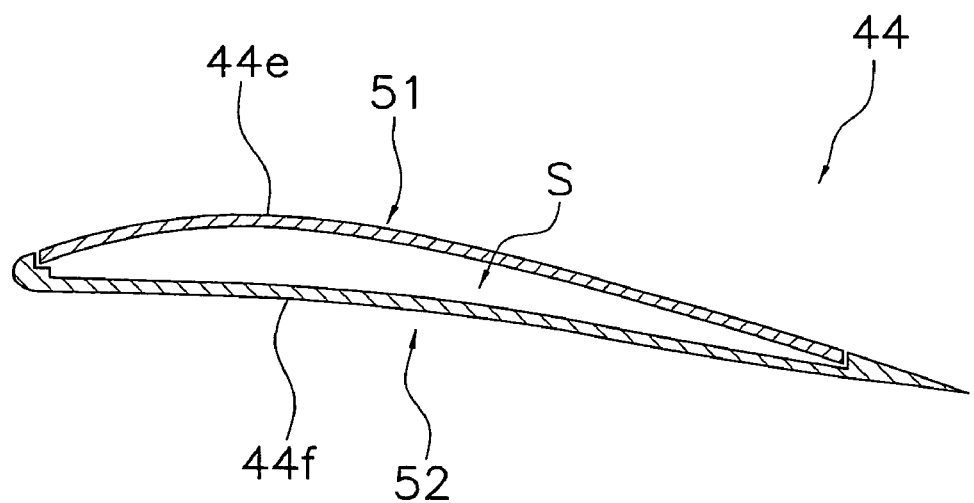
Figure 18:
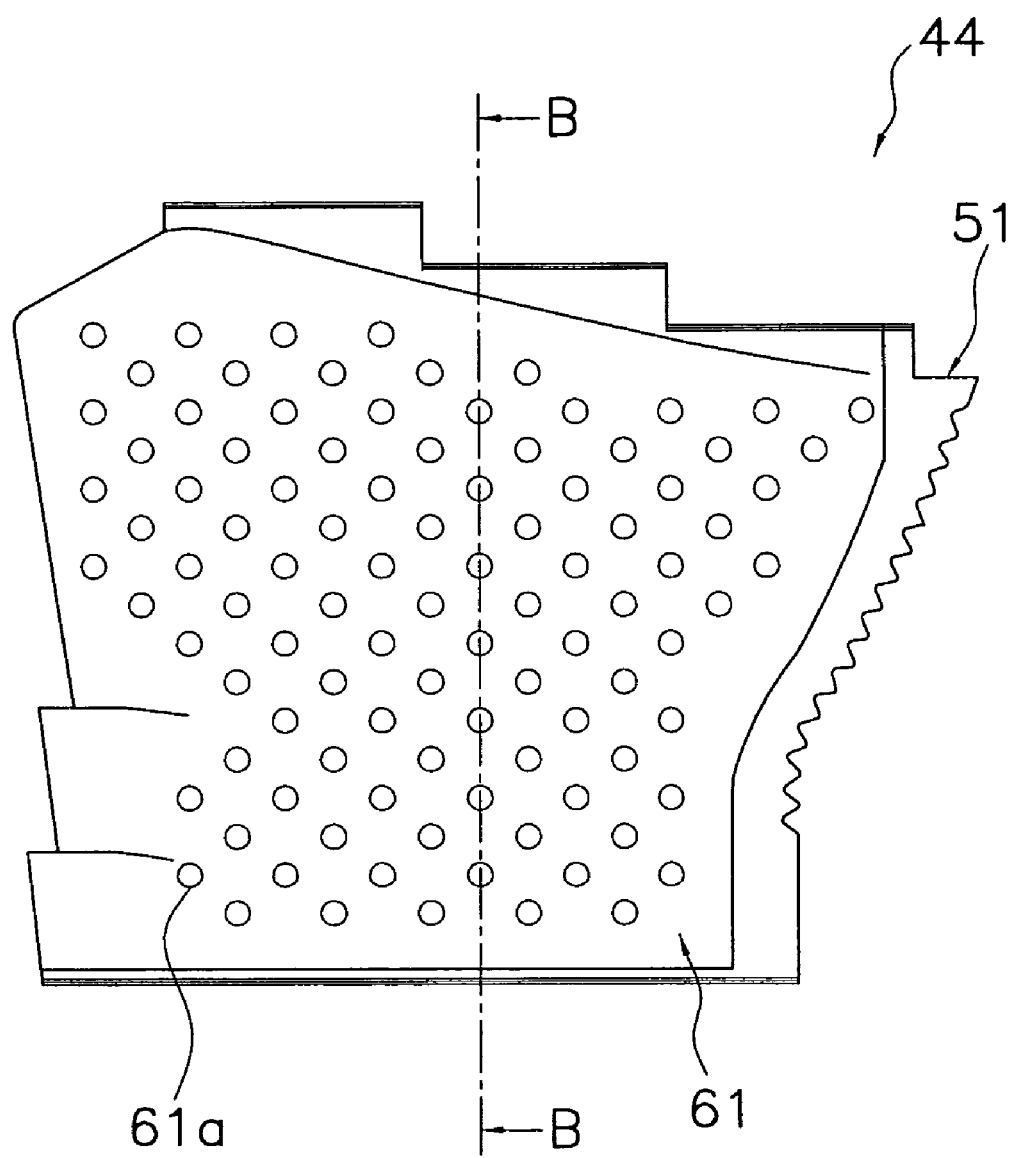
Figure 19:
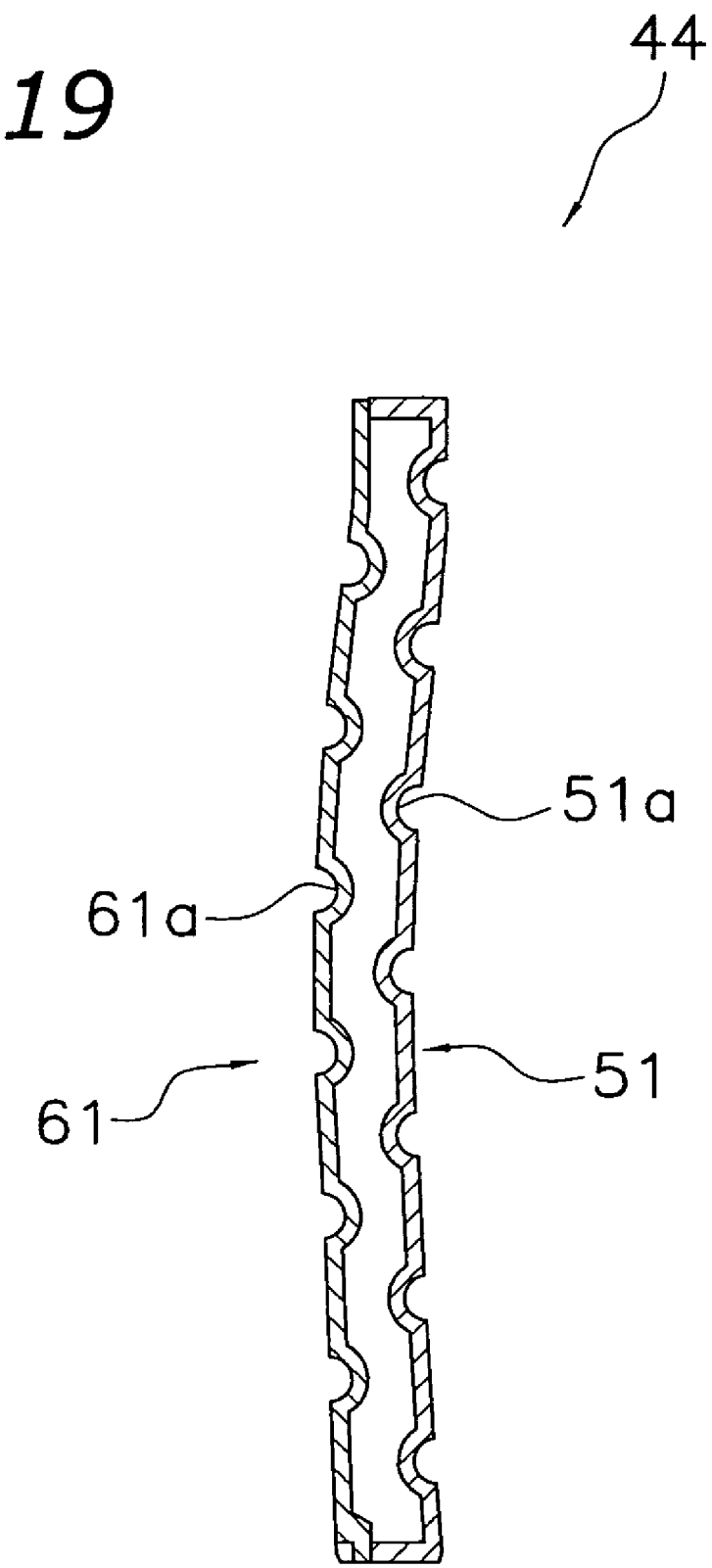

<FIG. 1>
An external perspective view of an air conditioner to which are applied an impeller of a centrifugal fan and a centrifugal fan disposed with the impeller according to an embodiment of the invention.
<FIG. 2>
A schematic side sectional view of the air conditioner.
<FIG. 3>
An external perspective view of the impeller.
<FIG. 4>
A view seen from arrow A of FIG. 3 (excluding part of an end ring).
<FIG. 5>
A schematic side view of a blade.
<FIG. 6>
A sectional view along B-B of FIG. 5.
<FIG. 7>
A sectional view along C-C of FIG. 5.
<FIG. 8>
A view seen from arrow D of FIG. 5.
<FIG. 9>
A view seen from arrow E of FIG. 5.
<FIG. 10>
A sectional view along F-F of FIG. 5.
<FIG. 11>
A sectional view along G-G of FIG. 4 (showing only the vicinity of the end ring).
<FIG. 12>
A sectional view along H-H of FIG. 4 (showing only the vicinity of the end ring).
<FIG. 13>
A partial plan view of an end plate.
<FIG. 14>
A sectional view along I-I of FIG. 13.
<FIG. 15>
A view showing a blade according to Modified Example 1, corresponding to FIG. 7.
<FIG. 16>
A view showing a blade according to Modified Example 2, corresponding to FIG. 7.
<FIG. 17>
A view showing a blade according to Modified Example 3, corresponding to FIG. 7.
<FIG. 18>
A view showing a blade according to Modified Example 5, corresponding to FIG. 5.
<FIG. 19>
A view showing a blade according to Modified Example 5, corresponding to FIG. 6.

DETAILED DESCRIPTION OF THE INVENTION

Embodiments of an impeller of a centrifugal fan and a centrifugal fan disposed with the impeller according to the invention will be described below on the basis of the drawings.
(1) Overall Configuration of the Air Conditioner
FIG. 1 shows an external perspective view (with the ceiling omitted) of an air conditioner 1 which is applied with an impeller of a centrifugal fan and a centrifugal fan disposed with the impeller according to an embodiment of the invention. The air conditioner 1 is a ceiling-embedded type air conditioner, and includes a casing 2 internally housing various constituent devices and a face panel 3 disposed on the underside of the casing 2. Specifically, as shown in FIG. 2 (schematic side sectional view of the air conditioner 1), the casing 2 of the air conditioner 1 is inserted and disposed in an opening formed in a ceiling U of an air-conditioned room. Furthermore, the face panel 3 is disposed such that it is fitted into the opening in the ceiling U.

The casing 2 is a box-shaped body formed in a substantially octagonal shape when seen in plan view, in which long sides and short sides are alternately formed and whose undersurface is open. The casing 2 includes a top plate 21 formed in a substantially octagonal shape, in which long sides and short sides are alternately formed, and side plates 22 that extend downward from the peripheral edge portion of the top plate 21.

The face panel 3 is a plate-like body formed in a substantially quadrangular shape when seen in plan view. The face panel 3 includes an inlet 31, which is disposed in the substantial center of the face panel 3 and sucks in the air inside the air-conditioned room, and plural (four in the present embodiment) outlets 32, which are formed such that they correspond to each of the four sides of the face panel 3 and blow the air from inside the casing out into the air-conditioned room. The sides of the face panel 3 are disposed such that they respectively correspond to the long sides of the top plate 21 of the casing 2. In the present embodiment, the inlet 31 is a substantially square-shaped opening. The four outlets 32 are each substantially rectangular-shaped openings that elongatedly extend in directions along the sides of the face panel 3. Furthermore, an inlet grille 33 and a filter 34 for removing airborne dust sucked in through the inlet 31 are disposed in the inlet 31. Horizontal flaps 35 that are swingable about shafts in the longitudinal direction are disposed in the outlets 32. The horizontal flaps 35 are substantially rectangular-shaped flap members that elongatedly extend in the longitudinal directions of each of the outlets 32. Shaft support pins disposed at both longitudinal-direction end portions of each of the horizontal flaps 35 are rotatingly driven by a motor (not shown), whereby it is possible to vary the direction of the air blown from the outlets 32 out into the air-conditioned room.

Principally disposed inside the casing 2 are a fan 4, which sucks the air inside the air-conditioned room through the inlet 31 of the face panel 3 into the casing 2 and blows the air out in the outer peripheral direction, and a heat exchanger 6, which is disposed such that it surrounds the outer periphery of the fan 4.

The fan 4 in the present embodiment is a turbofan serving as one type of centrifugal fan. The fan 4 includes a fan motor 41 (drive mechanism), which is disposed in the center of the top plate 21 of the casing 2, and an impeller 42, which is coupled to and rotatingly driven by a shaft 41a (rotating shaft) of the fan motor 41. The detailed structure of the impeller 42 will be described later.

In the present embodiment, the heat exchanger 6 is a cross finned tube-type heat exchanger panel formed bent such that it surrounds the outer periphery of the fan 4. The heat exchanger 6 is connected via a refrigerant pipe to an outdoor unit (not shown) disposed outdoors or the like. The heat exchanger 6 is configured to be able to function as an evaporator during cooling operation and as a condenser during heating operation. Thus, the heat exchanger 6 can exchange heat with the air sucked in by the fan 4 through the inlet 31 into the casing 2, cool the air during cooling operation, and heat the air during heating operation.

A drain pan 7 for receiving drain water generated by the condensation of airborne moisture in the heat exchanger 6 is disposed at the underside of the heat exchanger 6. The drain pan 7 is attached to the lower part of the casing 2. The drain pan 7 includes an inlet hole 71 formed such that it communicates with the inlet 31 of the face panel 3, outlet holes 72 formed such that they correspond to the outlets 32 of the face panel 3, and drain a water-receiving groove 73 that is formed in the underside of the heat exchanger 6 and receives the drain water.

Furthermore, a bell mouth 5 for guiding the air sucked in from the inlet 31 to the impeller 42 of the fan 4 is disposed in the inlet hole 71 of the drain pan 7.

As described above, an airflow path is formed in the air conditioner 1 which leads from the inlet 31 of the face panel 3 to the four outlets 32 via the filter 34, the bell mouth 5, the drain pan 7, the fan 4 and the heat exchanger 6. The airflow path is configured such that the air can be blown out into the air-conditioned room after the air inside the air-conditioned room is sucked in and heat-exchanged in the heat exchanger 6.

(2) Structure of the Impeller

Next, the structure of the impeller 42 will be described using FIG. 2, FIG. 3 and FIG. 4. Here, FIG. 3 is an external perspective view of the impeller 42. FIG. 4 is a view seen from arrow A of FIG. 3 (excluding part of an end ring 45).

The impeller 42 principally includes a disc-shaped end plate 43 (main plate) coupled to the shaft 41a of the fan motor 41, plural (seven in the present embodiment) blades 44 annularly disposed around the shaft 41a at the side of the end plate 43 opposite from the fan motor 41, and an annular end ring 45 (side plate) disposed such that it sandwiches the plural blades 44 between itself and the end plate 43 in the shaft direction. Here, O-O represents the center axis line of the shaft 41a (i.e., the rotational axis line of the impeller 42), and R represents the rotational direction of the impeller 42.

The end plate 43 is a resin-made member formed such that a substantially conical convex portion 43a protrudes towards the inlet 31 in the center portion thereof. Plural (five in the present embodiment) cooling air holes 43b comprising long holes formed such that they are arranged on a concentric circle of the end plate 43 are formed in the convex portion 43a. Moreover, a hub cover 46 is fixed to the surface of the end plate 43 at the side opposite from the fan motor 41 such that the hub cover 46 covers the plural cooling air holes 43b in a state where there is a predetermined interval between itself and the end plate 43. The hub cover 46 includes, in its surface at the end plate 43 side, plural (five in the present embodiment) guide blades 46a disposed such that they protrude radially. Thus, due to the pressure difference between the static pressure of the space at the fan motor 41 side of the end plate 43 and the static pressure of the space at the side of the end plate 43 opposite from the fan motor 41, part of the air blown out to the outer peripheral side of the impeller 42 passes through the vicinity of the fan motor 41, cools the fan motor 41, and thereafter is again blown into the space inside the impeller 42 via the cooling air holes 43b in the end plate 43 and the guide blades 46a of the hub cover 46.

The end ring 45 is a bell-shaped resin-made member that protrudes from its outer peripheral portion toward the inlet 31 as it approaches the opening in the center portion.

Next, the blades 44 will be described using FIGS. 3 to 10. Here, FIG. 5 is a schematic side view of one of the blades 44. FIG. 6 is a sectional view along B-B of FIG. 5. FIG. 7 is a sectional view along C-C of FIG. 5. FIG. 8 is a view seen from arrow D of FIG. 5. FIG. 9 is a view seen from arrow E of FIG. 5. FIG. 10 is a sectional view along F-F of FIG. 5.

In the present embodiment, the blades 44 are resin-made members that are molded separately from the end plate 43 and the end ring 45. One end of each blade 44 is fixed to the end plate 43, and the other end of each blade 44 is fixed to the end ring 45. In the present embodiment, each blade 44 has a wing-shape where an end portion 44a at the end plate 43 side slants further backward than an end portion 44b at the end ring 45 side when the impeller 42 is seen in plan view, and is formed such that the end portions 44a and 44b intersect when the impeller 42 is seen in plan view. In other words, each blade 44 has a shape that extends in the shaft direction while twisting between the end plate 43 and the end ring 45 (called "three-dimensional blades" below).

In the present embodiment, a front edge angle portion 44c protruding in a stepped manner (two steps in the present embodiment) toward the inner peripheral side of the impeller 42 is formed on the end portion at the R direction side (called "front edge portion" below) of each of the blades 44 comprising the three-dimensional blades. The front edge angle portion 44c includes the function of preventing the separation of airflow from a negative-pressure surface 44f of the blade 44 when the airflow sucked into the impeller 42 through the inlet 31 and the bell mouth 5 is blown out toward the outer peripheral side by the blade 44, and contributes to reducing the noise of the fan 4. Here, the negative-pressure surface 44f is the surface of the blade 44 facing the inner peripheral side of the impeller 42, and the surface opposite from the negative-pressure surface 44f, i.e., the surface of the blade 44 facing the outer peripheral side of the impeller 42, is a positive-pressure surface 44e.

In the present embodiment, plural rear edge protrusions 44d having a wave-like shape toward the outer peripheral side of the impeller 42 are formed on the opposite end portion in the R direction (called "rear edge portion" below) of each of the blades 44. The plural rear edge protrusions 44d include the function of reducing the pressure difference at the boundary between the positive-pressure surface 44e and the negative-pressure surface 44f at the rear edge portion of the blade 44 when the airflow sucked into the impeller 42 through the inlet 31 and the bell mouth 5 is blown out toward the outer peripheral side by the blade 44, and contribute to reducing the noise of the fan 4. The shapes and numbers of the front edge angle portion 44c and the plural rear edge protrusions 44d are not limited to the shapes and numbers in the present embodiment. Also, when it is not necessary to improve the noise performance, it is not invariably necessary to dispose the front edge angle portion 44c and the plural rear edge protrusions 44d at the front edge portion and rear edge portion of the blade 44.

Next, the detailed structure of the blades 44 will be described. Each blade 44 is a hollow blade comprising a blade body 51 (first surface portion), which is fixed to the end plate 43 and the end ring 45, and a blade cover 61 (second surface portion), which is attached to the blade body 51 by being fitted into the blade body 51 and forms a hollow space S between itself and the blade body 51 in the present embodiment.

The blade body 51 in the present embodiment is a plate-like member principally configuring the positive-pressure surface 44e and part of the negative-pressure surface 44f of the blade 44 (specifically, the rear edge portion of the negative-pressure surface 44f). The blade cover 61 in the present embodiment is a plate-like member principally configuring part of the negative-pressure surface 44f (specifically, the portion of the negative-pressure surface 44f excluding the rear edge portion).

The blade body 51 is configured by a positive-pressure surface portion 52 configuring the positive-pressure surface 44e of the blade 44, a ring-side edge portion 53 formed at the end ring 45 side of the positive-pressure surface portion 52, a rear edge-side edge portion 54 formed at the rear edge side of the positive-pressure surface portion 52, a front edge-side edge portion 55 formed at the front edge side of the positive-pressure surface portion 52, and a plate-side edge portion 56 formed at the end plate 43 side of the positive-pressure surface portion 52.

The positive-pressure surface portion 52 includes, in its substantial center portion, plural (three in the present embodiment) annular protrusions 52a that protrude toward the blade cover 61 side.

The ring-side edge portion 53 includes a ring-side body end portion 53a, which extends toward the blade cover 61 side, and plural (three in the present embodiment) ring-side abutment portions 53b, which are formed at the end plate 43 side of the ring-side body end portion 53a and against which a ring-side edge portion 63 (described later) of the blade cover 61 abuts. The ring-side body end portion 53a is formed such that it forms an end surface where the distance between it and the end plate 43 becomes shorter in a stepped manner (three steps in the present embodiment) from the front edge side toward the rear edge side of the blade 44. The ring-side abutment portions 53b are formed such that they protrude from the surface of the positive-pressure surface portion 52 at the blade cover 61 side toward the blade cover 61.

The rear edge-side edge portion 54 configures the rear edge portion of the positive-pressure surface 44e and the rear edge portion of the negative-pressure surface 44f of the blade 44, and includes the plural rear edge protrusions 44d described above and a rear edge-side abutment portion 54a, which is formed at the front edge side of the rear edge protrusions 44d and against which a rear edge-side edge portion 64 (described later) of the blade cover 61 abuts.

The front edge-side edge portion 55 configures the portion of the front edge angle portion 44c at the positive-pressure surface portion 52 side, and includes a first front edge-side abutment portion 55a, which is formed at the rear edge side of the front edge angle portion 44c and against which a front edge-side edge portion 65 (described later) of the blade cover 61 abuts, and plural (five in the present embodiment) second front edge-side abutment portions 55b, which are formed at the rear edge side of the first front edge-side abutment portion 55a and against which the front edge-side edge portion 65 of the blade cover 61 abuts. The second front edge-side abutment portions 55b are formed such that they protrude from the surface of the positive-pressure surface portion 52 at the blade cover 61 side toward the blade cover 61.

The plate-side edge portion 56 includes a plate-side body end portion 56a, which extends toward the blade cover 61, and a slit hole 56b and a positioning hole 56c, which are formed in the plate-side body end portion 56a. The slit hole 56b is a slit-shaped long hole disposed along the surface of a plate-side edge portion 66 (described later) of the blade cover 61 at the blade body 51 side in the substantial center of the plate-side body end portion 56a. The positioning hole 56c is a circular hole disposed at the front edge side of the slit hole 56b.

The blade cover 61 is configured by a negative-pressure surface portion 62 configuring part of the negative-pressure surface 44f of the blade 44 (specifically, the portion of the negative-pressure surface 44f excluding the rear edge portion), a ring-side edge portion 63 formed at the end ring 45 side of the negative-pressure surface portion 62, a rear edge-side edge portion 64 formed at the rear edge side of the negative-pressure surface portion 62, a front edge-side edge portion 65 formed at the front edge side of the negative-pressure surface portion 62, and a plate-side edge portion 66 formed at the end plate 43 side of the negative-pressure surface portion 62.

The negative-pressure surface portion 62 includes plural (three in the present embodiment) fitting protrusions 62a that protrude toward the blade body 51 at positions corresponding to the annular protrusions 52a formed in the positive-pressure surface portion 52 of the blade body 51. The fitting protrusions 62a fit into corresponding recesses in the centers of the annular protrusions 52a, and are inserted until the surface of the negative-pressure surface portion 62 at the blade body 51 side abuts against the end portions of the annular protrusions 52a at the blade cover 61 side and/or until the surface of the positive-pressure surface portion 52 at the blade cover 61 side abuts against the end portions of the fitting protrusions 62a at the blade body 51 side.

The ring-side edge portion 63 has a shape along the stepped end surface of the ring-side body end portion 53a, and abuts against the end surface of the ring-side body end portion 53a at the blade cover 61 side and the end surfaces of the ring-side abutment portions 53b at the blade cover 61 side. Here, the end surface of the ring-side body end portion 53a at the end ring 45 side protrudes slightly further toward the end ring 45 than the end surface of the ring-side body end portion 63a at the end ring 45 side. Additionally, the end portion 44b fixed to the end ring 45 is configured by the ring-side edge portion 53 of the blade body 51 and the ring-side edge portion 63 of the blade cover 61.

The rear edge-side edge portion 64 has a shape along the rear edge-side edge portion 54, and abuts against the end surface of the rear edge-side abutment portion 54a at the blade cover 61 side.

The front edge-side edge portion 65 configures the portion of the front edge angle portion 44c at the negative-pressure surface portion 62 side, and abuts against the end surface of the first front edge-side abutment portion 55a at the blade cover 61 side and the end surfaces of the second front edge-side abutment portions 55b at the blade cover 61 side.

The plate-side edge portion 66 has a shape along the end surface of the ring-side body end portion 53a, and abuts against the end surface of the plate-side body end portion 56a at the end ring 45 side. An engagement pawl 66a that is insertable into the slit hole 56a from the end ring 45 side toward the end plate 43 side is formed at the end portion of the plate-side edge portion 66 at the end plate 43 side. Here, the fitting pawl 66a is formed such that it does not protrude from the end surface of the plate-side body end portion 56a at the end plate 43 side when the fitting pawl 66a has been inserted into the slit hole 56b. Additionally, the end portion 44a fixed to the end plate 43 is configured by the plate-side edge portion 56 of the blade body 51 and the plate-side edge portion 66 of the blade cover 61.

The blade 44 is assembled by inserting the engagement pawl 66a of the blade cover 61 into the slit hole 56b in the blade body 51 and thereafter fitting the edge portions 63 to 66 of the blade cover 61 into the edge portions 53 to 56 of the blade body 51. Thus, the hollow space S is formed between the blade body 51 and the blade cover 61. Here, because the blade body 51 and the blade cover 61 are separately molded, there are few restrictions on the direction in which they are removed from the mold when they are molded, and it is easy to enlarge the space S even in a three-dimensional blade such as the blade 44 of the present embodiment. Thus, the hollowing of the blades 44 can be promoted, and the weight of the impeller 42 can be reduced.

Incidentally, because the hollow space S is formed between the blade body 51 and the blade cover 61 when the blade 44 is assembled as described above, the blade cover 61 tries to deform toward the blade body 51 when a load is applied to the blade cover 61 in the blade body 51 direction.

However, as described below, a blade shape retaining mechanism is disposed in the blade 44 of the present embodiment for retaining the shape of the blade 44 by preventing each portion of the blade cover 61 from being deformed toward the blade body 51 when a load is applied to the blade cover 61 in the direction of the blade body 51. Specifically, the center portion of the blade cover 61 is retained, such that it is not deformed toward the blade body 51, as a result of the fitting protrusions 62a formed on the negative-pressure surface portion 62 of the blade cover 61 and the annular protrusions 52a formed on the positive-pressure surface portion 52 of the blade body 51 being fitted together. Also, the portion of the blade cover 61 at the end ring 45 side is retained, such that it is not deformed toward the blade body 51, as a result of the end surface of the ring-side edge portion 63 of the blade cover 61 at the blade body 51 side abutting against the end surface of the ring-side body end portion 53a of the blade body 51 at the blade cover 61 side and the end surfaces of the ring-side abutment portions 53b at the blade cover 61 side. Also, the rear edge portion of the blade cover 61 is retained, such that it is not deformed toward the blade body 51, as a result of the rear edge-side edge portion 64 of the blade cover 61 abutting against the end surface of the rear edge-side abutment portion 54a of the blade body 51 at the blade cover 61 side. Also, the front edge portion of the blade cover 61 is retained, such that it is not deformed toward the blade body 51, as a result of the front edge-side edge portion 65 of the blade cover 61 abutting against the end surface of the first front edge-side abutment portion 55a of the blade body 51 at the blade cover 61 side and the end surfaces of the second front edge-side abutment portions 55b at the blade cover 61 side. Moreover, the portion of the blade cover 61 at the end plate 43 side is retained, such that it is not deformed toward the blade body 51, as a result of the engagement pawl 66a formed at the plate-side edge portion 66 of the blade cover 61 being inserted into the slit hole 56b formed in the plate-side body end portion 56a of the blade body 51.

Next, the structure and method of fixing the blades 44 to the end plate 43 and the end ring 45 will be described using FIG. 11 to FIG. 14. Here, FIG. 11 is a sectional view (showing only the vicinity of the end ring 45) along G-G of FIG. 4. FIG. 12 is a sectional view (showing only the vicinity of the end ring 45) along H-H of FIG. 4. FIG. 13 is a partial plan view of the end plate 43. FIG. 14 is a sectional view along I-I of FIG. 13.

When the blades 44 are to be fixed to the end ring 45, the plural blades 44 must be disposed at predetermined fixing positions, and a ring-side guide mechanism for positioning the blades 44 is disposed in the impeller 42 of the present embodiment. The ring-side guide mechanism is configured by the end portions 44b of the blades 44 at the end ring 45 side (specifically, the ring-side edge portions 53 of the blade bodies 51 and the ring-side edge portions 63 of the blade covers 61) and by fitting recesses 45a that are formed in the end ring 45 and into which the end portions 44b can be fitted. Each of the fitting recesses 45a has a shape along the stepped end surface of the ring-side body end portion 53a of the end portion 44b. Thus, the end portions 44b of the blades 44 at the end ring 45 side can be positioned by the fitting recesses 45a in the end ring 45.

Additionally, the blades 44 are fixed to the end ring 45 by welding the end portions 44b (specifically, the ring-side edge portions 53 of the blade bodies 51) and the fitting recesses 45a together in a state where the end portions 44b have been fitted into the fitting recesses 45a. For the welding method here, in consideration of the blades 44 of the present embodiment being hollowed and becoming thin, it is preferable to use laser welding where the width of the thermally affected portion during welding is small and where there are few strains.

Also, when laser welding is used as the welding method, it is preferable to use, as the material configuring the end ring 45, a material whose light transmittance is higher than that of the material configuring the blade bodies 51. For example, it is conceivable to make the color of the end ring 45 white and to make the color of the blade bodies 51 black. Thus, the work of the laser welding can be conduced from the end ring 45 side.

Even when the blades 44 are to be fixed to the end plate 43, similar to when they are fixed to the end ring 45, the plural blades 44 must be disposed at predetermined fixing positions, but a plate-side guide mechanism for positioning the blades 44 is disposed in the impeller 42 of the present embodiment. The plate-side guide mechanism is configured by the end portions 44a of the blades 44 at the end plate 43 side (specifically, the plate-side edge portions 56 of the blade bodies 51 and the plate-side edge portions 66 of the blade covers 61), wing-shaped protrusions 43c that are formed on the end plate 43 and into which the end portions 44a are insertable, and positioning protrusions 43d that are insertable into the positioning holes 56c formed in the end portions 44a (specifically, the plate-side body end portions 56a). The wing-shaped protrusions 43c have a shape along the shape of the peripheral edge portion of the end portions 44a. Thus, the end portions 44a of the blades 44 at the end plate 43 side can be positioned by the wing-shaped protrusions 43c and the positioning protrusions 43d of the end plate 43.

Additionally, the blades 44 are fixed to the end plate 43 by welding together the end portions 44a (specifically, the plate-side edge portions 56 of the blade bodies 51) and the portions surrounded by the wing-shaped protrusions 43c of the end plate 43 in a state where the end portions 44a have been inserted into the wing-shaped protrusions 43c and the positioning protrusions 43d. Here, similar to when the blades 44 are welded to the end ring 45, it is preferable to use laser welding as the welding method. Also, when laser welding is used as the welding method, similar to when the blades 44 are welded to the end ring 45, it is preferable to use, as the material configuring the end plate 43, a material whose light transmittance is higher than that of the material configuring the blade bodies 51.

The impeller 42 of the present embodiment can be assembled by the following procedure using the aforementioned structure and method of fixing the blades 44 to the end plate 43 and the end ring 45. First, the plural blades 44 are assembled by attaching the blade covers 61 to the blade bodies 51 by fitting the blade covers 61 into the blade bodies 51. Next, positioning is conducted by fitting the end portions 44b of the plural blades 44 at the end ring 45 side into the fitting recesses 45a in the end ring 45. Next, positioning of the assembly in the state where the end portions 44b of the plural blades 44 have been fitted into the fitting recesses 45a in the end ring 45 is conducted by inserting the end portions 44a of the blades 44 at the end plate 43 side into the wing-shaped protrusions 43c and the positioning protrusions 43d of the end plate 43. Then, the end portions 44a and the end portions 44b of the blades 44 (specifically, the plate-side edge portions 56 and the ring-side edge portions 53 of the blade bodies 51) are fixed to the end plate 43 and the end ring 45 by laser welding.

(3) Operation of the Air Conditioner

Next, the operation of the air conditioner 1 will be described.

When the air conditioner 1 begins running, the fan motor 41 is driven and the impeller 42 of the fan 4 rotates. Along with the driving of the fan motor 41, refrigerant is supplied from the outdoor unit (not shown) to the inside of the heat exchanger 6. Here, the heat exchanger 6 acts as an evaporator during cooling operation and as a condenser during heating operation. Then, in accompaniment with the rotation of the impeller 42, the air inside the air-conditioned room is sucked in from the inlet 31 of the face panel 3 through the filter 34 and the bell mouth 5 from the underside of the fan 4. The sucked-in air is blown out to the outer peripheral side by the impeller 42, reaches the heat exchanger 6, is cooled or heated in the heat exchanger 6, and then blown through the plural outlets 32 out into the air-conditioned room. In this manner, the inside of the air-conditioned room is cooled or heated.

Here, as shown in FIG. 4, centrifugal force acts on the plural blades 44 because the impeller 42 of the fan 4 rotates in the R direction. The blades 44 comprising hollow blades in the present embodiment are configured by the blade covers 61, which are disposed such that they configure part of the negative-pressure surfaces 44f of the blades 44 (specifically, the portions of the negative-pressure surfaces 44f excluding the rear edge portions), being attached to the blade bodies 51 fixed to the end plate 43 and the end ring 45, whereby it becomes possible to prevent the blade covers 61 attached to the blade bodies 51 from rising due to centrifugal force and to prevent the blades 44 from being deformed. Thus, it becomes difficult for drawbacks such as squeaking and wind roar of the impeller 42 to occur, so that the blowing performance and noise performance of the fan 4 or the air conditioner 1 overall can be improved.

Moreover, the blade covers 61 are disposed such that they configure part of the negative-pressure surfaces 44f of the blades 44, and the blade covers 61 are prevented from rising due to centrifugal force. As a result, a load in the direction of the blade bodies 51 is applied to the blade covers 61, but the each portion of the blade covers 61 is prevented from being deformed toward the blade body 51 and the shapes of the blades 44 are retained because the aforementioned blade shape retaining mechanism is disposed.

(4) Characteristics of the Impeller of the Fan and the Fan Disposed with the Impeller The impeller 42 of the fan 4 utilized in the air conditioner 1 of the present embodiment and the fan 4 disposed with the impeller have the following characteristics.

(A)

In the impeller 42 of the fan 4 of the present embodiment, the plural blades 44 are configured by the blade bodies 51 and the blade covers 61 attached to the blade bodies 51. Thus, even if the blades 44 are three-dimensional blades that extend in the shaft direction while twisting between the end plate 43 and the end ring 45, the hollowing of the blades 44 can be promoted and the weight of the impeller 42 can be reduced.

Moreover, the assembly of the blades 44 becomes easy because the blade covers 61 are attached to the blade bodies 51 by being fitted into the blades bodies 51.

Also, the blade bodies 51 are fixed to the end plate 43, and the blade covers 61 are disposed such that they configure part of the negative-pressure surfaces 44f of the blades 44 (specifically, the portions of the negative-pressure surfaces 44f excluding the rear edge portions). In other words, the blade covers 61 are disposed such that even if centrifugal force resulting from the rotation of the end plate 43 acts on the blade covers 61, the state where the blade covers 61 are attached to the blade bodies 51 is retained. Thus, the blade covers 61 attached to the blade bodies 51 can be prevented from rising due to centrifugal force and the blades 44 can be prevented from being deformed, and it becomes difficult for drawbacks such as squeaking and wind roar to occur. In particular, there is also the advantage that drawbacks such as the blade covers 61 becoming detached due to centrifugal force do not arise in the blades 44 assembled by the blade covers 61 being fitted into the blade bodies 51 as in the present embodiment.

Also, the blade covers 61 are disposed such that they configure part of the negative-pressure surfaces 44f of the blades 44 to ensure that the blade covers 61 are prevented from rising due to centrifugal force. As a result, a load in the plate body 51 direction acts on the blade covers 61, but the each portion of the blade covers 61 is prevented from being deformed toward the blade bodies 51 and the shapes of the blades 44 are retained because the blade shape retaining mechanism is disposed. Thus, it becomes difficult for drawbacks such as squeaking and wind roar of the blades 44 to occur.

In this manner, the fan 4 of the present embodiment is disposed with the impeller 42 where the hollowing of the blades 44 is promoted, the weight of the impeller 42 is reduced, deformation of the blades 44 is prevented, and drawbacks such as squeaking and wind roar are difficult to occur. Thus, the blowing performance and the noise performance can be improved.

(B)

Also, because the plural blade bodies 51, the end plate 43 and the end ring 45 are separate members in the impeller 42 of the fan 4, the molding of the blade bodies 51 configuring the blades 44, the molding of the end plate 43, and the molding of the end ring 45 become easy.

(C)

Also, because laser welding is utilized in the impeller 42 of the fan 4 as the method of fixing the plural blade bodies 51 to the end plate 43 and as the method of fixing the plural blade bodies 51 to the end ring 45, it is possible to weld the blades 44 to the end plate 43 and the end ring 45 even if the blades 44 are hollowed, become thin, and undergo a reduction in strength. 21

Moreover, by using, as the material configuring the end plate 43 and the end ring 45, a material whose light transmittance is higher than that of the material configuring the plate bodies 51, the work of laser welding the end plate 43 and the plate bodies 51 together an be conducted from the end plate 43 side, and the work of laser welding the end ring 45 and the plate bodies 45 together can be conducted from the end ring 45 side.

(D)

Moreover, because the plate-side guide mechanism for positioning the blades 44 in the end plate 43 and the ring-side guide mechanism for positioning the blades 44 in the end ring 45 are disposed in the impeller 42 of the fan 4, workability when fixing the blades 44 to the end plate 43 and the end ring 45 is improved.

Modified Examples 1 to 3

As shown in FIG. 7, each of the blades 44 in the preceding embodiment is divided such that the blade cover 61 configures the portion of the negative-pressure surface 44f excluding the rear edge portion serving as part of the blade 44 and such that the blade body 51 configures the positive-pressure surface 44e and the rear edge portion of the negative-pressure surface 44f. However, each of the blades 44 may also have the following divided structure between the blade cover 61 and the blade body 51 in order to promote the hollowing of the blade 44 and prevent drawbacks such as squeaking and wind roar.

For example, as shown in FIG. 15 (a view showing a blade according to Modified Example 1, corresponding to FIG. 7), the blade 44 may be divided such that the blade body 51 configures not only the rear edge portion of the negative-pressure surface 44f but also the front edge portion of the negative-pressure surface 44f, and such that the blade cover 61 configures the negative-pressure surface 44f excluding its front edge portion and rear edge portion.

Also, as shown in FIG. 16 (a view showing a blade according to Modified Example 2, corresponding to FIG. 7), the blade 44 may be divided such that the blade cover 61 configures the negative-pressure surface 44f and the rear edge portion of the positive-pressure surface 44e, and such that the blade body 51 configures the portion of the positive-pressure surface 44e excluding the rear edge portion.

Moreover, as shown in FIG. 17 (a view showing a blade according to Modified Example 3, corresponding to FIG. 7), the blade 44 may be divided such that that blade cover 61 configures the negative-pressure surface 44f and the front edge portion and the rear edge portion of the positive-pressure surface 44e, and such that the blade body 51 configures the portion of the positive-pressure surface 44e excluding the front edge portion and the rear edge portion.

By dividing the blade 44 such that the blade cover 61 configures at least part of the blade 44 in this manner, the hollowing of the blade 44 can be promoted and drawbacks such as squeaking and wind roar can be prevented.

Modified Example 4

In the preceding embodiments, hollowing was promoted by giving each of the blades 44 a divided structure between the blade body 51 and the blade cover 61, the blade body 51 was fixed to the end plate 43 and the end ring 45 molded separately from the blade body 51, and the blade cover 61 configuring at least part of the negative-pressure surface 44f of the blade 44 was attached to the blade body 51 by fitting it into the blade body 51, whereby the impeller 42 was configured where it is difficult for drawbacks such as squeaking and wind roar to occur.

However, the blade bodies 51 and the end plate 43 and the end ring 45 do not always have to be separate members in order to promote the hollowing of the blades 44 and prevent drawbacks such as squeaking and wind roar.

For example, the blade bodies 51 and the end plate 43 may be integrally molded and the end ring 45 may be molded as a separate member. By configuring the invention in this manner, the blade covers 61 are attached to the blade bodies 51 integrally molded with the end plate 43 by fitting the blade covers 61 into the blade bodies 51, and the end ring 45 is fixed to the blade bodies 51, whereby the impeller 42 can be configured which promotes the hollowing of the blades 44 and prevents drawbacks such as squeaking and wind roar.

The blades bodies 51 and the end ring 45 may also be integrally molded and the end plate 43 may be molded as a separate member.

Moreover, the blades bodies 51 and the end plate 43 and the end ring 45 may be integrally molded, and just the blade covers 61 may be attached to the blade bodies 51 by fitting the blade covers 61 into the blade bodies 51.

Modified Example 5

In the preceding embodiments, because the blade cover 61 configuring the majority of the negative-pressure surface 44f of each of the blades 44 was a member separate from the blade body 51 and the end plate 43 and the end ring 45, there were few restrictions in direction in which it is removed from the mold when it is molded, and a concavo-convex shape could be easily formed in the surface of the blade cover 61. Also, when the blade body 51 is molded separately from the end plate 43 and the end ring 45, a concavo-convex shape can also be easily formed in the surface of the blade body 51.

For example, as shown in FIG. 18 (a view showing a blade according to Modified Example 5, corresponding to FIG. 5) and FIG. 19 (a view showing a blade according to Modified Example 5, corresponding to FIG. 5), plural dimples 51a and 61a can be formed in the surfaces of the blade body 51 and the blade cover 61.

By disposing the plural dimples 51a and 61a in the surfaces of the blade body 51 and the blade cover 61, separation of the airflow flowing in the vicinity of the surfaces of the blade body 51 and the blade cover 61 can be prevented, so that the blowing performance and noise performance of the fan 4 can be improved.

Other Embodiments

Embodiments of the present invention have been described above on the basis of the drawings, but the specific configuration of the invention is not limited to these embodiments and can be altered in a range that does not depart from the gist of the invention.

For example, in the preceding embodiments, the invention was applied to a turbofan impeller serving as an example of an impeller of a centrifugal fan, but the invention may also be applied to an impeller of another centrifugal fan such as an impeller of a diagonal-flow fan.

INDUSTRIAL APPLICABILITY

The use of the present invention enables, in a centrifugal fan disposed with a resin-made impeller of the type that sucks in air from a rotating shaft direction and blows out the air in a direction intersecting the rotating shaft, a reduction in the weight of the impeller even when utilizing blades that extend while twisting in the shaft direction.

What is claimed is:

1. An impeller of a centrifugal fan comprising:
   a main plate configured to rotate around a rotating shaft, the main plate being constructed of resin material;
   a plurality of hollow blades annularly disposed around the rotating shaft, each of the hollow blades including
      a first surface portion integrally molded with or fixed to the main plate, the first surface portion being constructed of resin material, and
      a second surface portion attached to the first surface portion to form a hollow space therebetween, the second surface portion being constructed of resin material; and
   a side plate fixed to the first surface portions by laser welding, the side plate being constructed of resin material and being molded separately from the first surface portions,
   the hollow blades being disposed between the main plate and the side plate,
   the main plate, the hollow blades and the side plate being configured to take in a gas from a rotating shaft direction and blow out the gas in a direction intersecting the rotating shaft,
   each of the second surface portions forming at least part of a negative-pressure surface, and each of the first surface portions forming at least part of a positive pressure surface, the hollow blades including a blade shape retaining mechanism to prevent the second surface portions from being deformed toward outer peripheral sides of the second surface portions by a centrifugal force, each of the first surface portions having an edge portion extending from a side plate end thereof toward a respective one of the second surface portions, with each edge portion being laser welded to the side plate, each edge portion having an end surface that abuts a lateral surface of the respective one of the second surface portions at a side plate end thereof to form part of the blade shape retaining mechanism and to define a side plate end of the hollow space, and the lateral surfaces of the second surface portions facing the first surface portions with the hollow spaces therebetween, the side plate ends of the hollow spaces, the first surface portions and the second surface portions being disposed at ends of the blades closer to the side plate than the main plate, and each blade having a leading rotational edge and a trailing rotational edge with the edge portion of the first side portion extending between the leading and trailing rotational edges of the blade such that an interior surface of the edge portion faces the main plate with the hollow space of the blade disposed between the interior surface of the edge portion and the main plate, the hollow space having a length measured between the leading and trailing rotational edges of the blade, and the edge portion extending along the entire length of the hollow space between the leading and trailing rotational edges of the blade.

2. The impeller of claim 1, wherein
the side plate includes a material with a higher light transmittance than a material of the first surface portions.

3. The impeller of claim 1, further comprising
a side plate-side guide mechanism to position the hollow blades in the side plate.

4. The impeller of claim 1, wherein
the second surface portions include plural concavo-convexities formed in surfaces of the second surface portions.

5. A centrifugal fan comprising:
the impeller of claim 1; and
a drive mechanism configured to rotate the main plate.

6. The impeller of claim 1, wherein
the second surface portion is attached to the first surface portion by inserting a portion of the second surface portion into the first surface portion.

7. An impeller of a centrifugal fan comprising:
a main plate configured to rotate around a rotating shaft, the main plate being constructed of resin material;
a plurality of hollow blades annularly disposed around the rotating shaft, each of the hollow blades including
  a first surface portion integrally molded with or fixed to the main plate, the first surface portion being constructed of resin material, and
  a second surface portion attached to the first surface portion to form a hollow space therebetween, the second surface portion being constructed of resin material; and
a side plate fixed to the first surface portions by laser welding, the side plate being constructed of resin material and being molded separately from the first surface portions,
the hollow blades being disposed between the main plate and the side plate,
the main plate, the hollow blades and the side plate being configured to take in a gas from a rotating shaft direction and blow out the gas in a direction intersecting the rotating shaft, and the second surface portion being configured to remain attached to the first surface portion while a centrifugal force resulting from the rotation of the main plate acts on the first surface portion, each of the first surface portions forming at least part of a positive pressure surface, the hollow blades including a blade shape retaining mechanism to prevent the second surface portions from being deformed toward outer peripheral sides of the second surface portions by the centrifugal force, and each of the first surface portions having an edge portion extending from a side plate end thereof toward a respective one of the second surface portions, with each edge portion being laser welded to the side plate, each edge portion having an end surface that abuts a lateral surface of the respective one of the second surface portions at a side plate end thereof to form part of the blade shape retaining mechanism and to define a side plate end of the hollow space, and the lateral surfaces of the second surface portions facing the first surface portions with the hollow spaces therebetween, the side plate ends of the hollow spaces, the first surface portions and the second surface portions being disposed at ends of the blades closer to the side plate than the main plate, and each blade having a leading rotational edge and a trailing rotational edge with the edge portion of the first side portion extending between the leading and trailing rotational edges of the blade such that an interior surface of the edge portion faces the main plate with the hollow space of the blade disposed between the interior surface of the edge portion and the main plate, the hollow space having a length measured between the leading and trailing rotational edges of the blade, and the edge portion extending along the entire length of the hollow space between the leading and trailing rotational edges of the blade.

8. The impeller of claim 7, wherein
the side plate includes a material with a higher light transmittance than a material of the first surface portions.

9. The impeller of claim 7, further comprising
a side plate-side guide mechanism to position the hollow blades in the side plate.

10. A centrifugal fan comprising:
the impeller of claim 7; and
a drive mechanism configured to rotate the main plate.

11. The impeller of claim 7, wherein
the second surface portions include plural concavo-convexities formed in surfaces of the second surface portions.

12. An impeller of a centrifugal fan comprising:
a main plate configured to rotate around a rotating shaft, the main plate being constructed of resin material;
a plurality of hollow blades annularly disposed around the rotating shaft, each of the hollow blades including
  a first surface portion fixed to the main plate by laser welding, the first surface portion being constructed of resin material and being molded separately from the main plate, and
  a second surface portion attached to the first surface portion to form a hollow space therebetween, the second surface portion being constructed of resin material; and a side plate integrally molded with or fixed to the first surface portions, the side plate being constructed of resin material, the hollow blades being disposed between the main plate and the side plate, the main plate, the hollow blades and the side plate being configured to take in a gas from a rotating shaft direction and blow out the gas in a direction intersecting the rotating shaft, each of the second surface portions forming at least part of a negative-pressure surface, and each of the first surface portions forming at least part of a positive pressure surface, the hollow blades including a blade shape retaining mechanism to prevent the second surface portions from being deformed toward outer peripheral sides of the second surface portions by a centrifugal force, and each of the first surface portions having an edge portion extending from a main plate end thereof toward a respective one of the second surface portions, with each edge portion being laser welded to the main plate, each edge portion having an end surface that abuts a lateral surface of the respective one of the second surface portions at a main plate end thereof to form part of the blade shape retaining mechanism and to define a main plate end of the hollow space, and the lateral surfaces of the second surface portions facing the first surface portions with the hollow spaces therebetween, the main plate ends of the hollow spaces, the first surface portions and the second surface portions being disposed at ends of the blades closer to the main plate than the side plate, and each blade having a leading rotational edge and a rotational trailing edge with the edge portion of the first side portion extending between the leading and trailing rotational edges of the blade such that an interior surface of the edge portion faces the side plate with the hollow space of the blade disposed between the interior surface of the edge portion and the side plate, the hollow space having a length measured between the leading and trailing rotational edges of the blade, and the edge portion extending along the entire length of the hollow space between the leading and trailing rotational edges of the blade.

13. The impeller of claim 12, wherein
the main plate includes a material with a higher light transmittance than a material of the first surface portions.

14. The impeller of claim 12, further comprising
a main plate-side guide mechanism to position the hollow blades in the main plate.

15. A centrifugal fan comprising:
the impeller of claim 12; and
a drive mechanism configured to rotate the main plate.

16. The impeller of claim 12, wherein
the second surface portions include plural concavo-convexities formed in surfaces of the second surface portions.

17. An impeller of a centrifugal fan comprising:
a main plate configured to rotate around a rotating shaft, the main plate being constructed of resin material;
a plurality of hollow blades annularly disposed around the rotating shaft, each of the hollow blades including
 a first surface portion fixed to the main plate by laser welding, the first surface portion being constructed of resin material and being molded separately from the main plate, and a second surface portion attached to the first surface portion to form a hollow space therebetween, the second surface portion being constructed of resin material; and a side plate integrally molded with or fixed to the first surface portions, the side plate being constructed of resin material, the hollow blades being disposed between the main plate and the side plate, the main plate, the hollow blades and the side plate being configured to take in a gas from a rotating shaft direction and blow out the gas in a direction intersecting the rotating shaft, and the second surface portion being configured to remain attached to the first surface portion while a centrifugal force resulting from the rotation of the main plate acts on the first surface portion, each of the first surface portions forming at least part of a positive pressure surface, the hollow blades including a blade shape retaining mechanism to prevent the second surface portions from being deformed toward outer peripheral sides of the second surface portions by the centrifugal force, and each of the first surface portions having an edge portion extending from a main plate end thereof toward a respective one of the second surface portions, with each edge portion being laser welded to the main plate, each edge portion having an end surface that abuts a lateral surface of the respective one of the second surface portions at a main plate end thereof to form part of the blade shape retaining mechanism and to define a main plate end of the hollow space, and the lateral surfaces of the second surface portions facing the first surface portions with the hollow spaces therebetween, the main plate ends of the hollow spaces, the first surface portions and the second surface portions being disposed at ends of the blades closer to the main plate than the side plate, and each blade having a leading rotational edge and a rotational trailing edge with the edge portion of the first side portion extending between the leading and trailing rotational edges of the blade such that an interior surface of the edge portion faces the side plate with the hollow space of the blade disposed between the interior surface of the edge portion and the side plate, the hollow space having a length measured between the leading and trailing rotational edges of the blade, and the edge portion extending along the entire length of the hollow space between the leading and trailing rotational edges of the blade.

18. The impeller of claim 17, wherein
the main plate includes a material with a higher light transmittance than a material of the first surface portions.

19. The impeller of claim 17, further comprising
a main plate-side guide mechanism to position the hollow blades in the main plate.

20. A centrifugal fan comprising:
the impeller of claim 17; and
a drive mechanism configured to rotate the main plate.

21. The impeller of claim 17, wherein
the second surface portions include plural concavo-convexities formed in surfaces of the second surface portions.

* * * * *